United States Patent
Nikovski et al.

(10) Patent No.: US 10,712,733 B2
(45) Date of Patent: Jul. 14, 2020

(54) METHODS AND SYSTEMS FOR DISCOVERY OF PROGNOSTIC SUBSEQUENCES IN TIME SERIES

(71) Applicant: Mitsubishi Electric Research Laboratories, Inc., Cambridge, MA (US)

(72) Inventors: Daniel Nikolaev Nikovski, Brookline, MA (US); Yan Zhu, Riverside, CA (US); Amir-massoud Farahmand, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 209 days.

(21) Appl. No.: 15/375,473

(22) Filed: Dec. 12, 2016

(65) Prior Publication Data
US 2018/0164794 A1 Jun. 14, 2018

(51) Int. Cl.
*G05B 23/02* (2006.01)
*G06N 5/02* (2006.01)
*G06N 5/00* (2006.01)

(52) U.S. Cl.
CPC ..... *G05B 23/0205* (2013.01); *G05B 23/0221* (2013.01); *G05B 23/0283* (2013.01); *G06N 5/003* (2013.01); *G06N 5/022* (2013.01); *G05B 2219/24033* (2013.01)

(58) Field of Classification Search
CPC ............ G05B 23/0205; G05B 23/0221; G05B 23/0283; G06N 5/022; G06N 2219/24033
See application file for complete search history.

(56) References Cited

U.S. PATENT DOCUMENTS 5,210,704 A * 5/1993 Husseiny ............... G01H 1/003
702/34
5,566,273 A * 10/1996 Huang ................. G06K 9/6222
706/25

(Continued)

OTHER PUBLICATIONS

Patri et al, Predicting Failures from Oilfield Sensor Data, 2014, SPE International, SPE-170680- MS, pp. 1-12 (Year: 2014).*

(Continued)

*Primary Examiner* — Lisa E Peters
(74) *Attorney, Agent, or Firm* — Gennadiy Vinokur; James McAleenan; Hironori Tsukamoto

(57) ABSTRACT

Systems and methods for determining a pattern in time series data representing an operation of a machine. A memory to store and provide a set of training data examples generated by a sensor of the machine, wherein each training data example represents an operation of the machine for a period of time ending with a failure of the machine. A processor configured to iteratively partition each training data example into a normal region and an abnormal region, determine a predictive pattern absent from the normal regions and present in each abnormal region only once, and determine a length of the abnormal region. Outputting the predictive pattern via an output interface in communication with the processor or storing the predictive pattern in memory, wherein the predictive pattern is a predictive estimate of an impending failure and assists in management of the machine.

20 Claims, 16 Drawing Sheets

(56) References Cited

U.S. PATENT DOCUMENTS

| | | | |
|---|---|---|---|
| 6,564,119 B1* | 5/2003 | Vaculik | B22D 11/16 164/151.5 |
| 2010/0169030 A1* | 7/2010 | Parlos | G01H 1/00 702/58 |
| 2013/0132001 A1* | 5/2013 | Yacout | G01D 3/10 702/35 |
| 2014/0133742 A1* | 5/2014 | Xiao | G06K 9/00664 382/159 |
| 2015/0088422 A1* | 3/2015 | Nikovski | G01C 21/36 701/538 |
| 2015/0235139 A1 | 8/2015 | Sharma et al. | |
| 2016/0217379 A1 | 7/2016 | Patri et al. | |

OTHER PUBLICATIONS

Mori Usue et al., "Reliable early classification of time series based on discriminating the classes over time." Journal of Data Mining and Knowledge Discovery, Norwell, MA US. vol. 31, No. 1, Apr. 29, 2016. pp. 233-263.

* cited by examiner

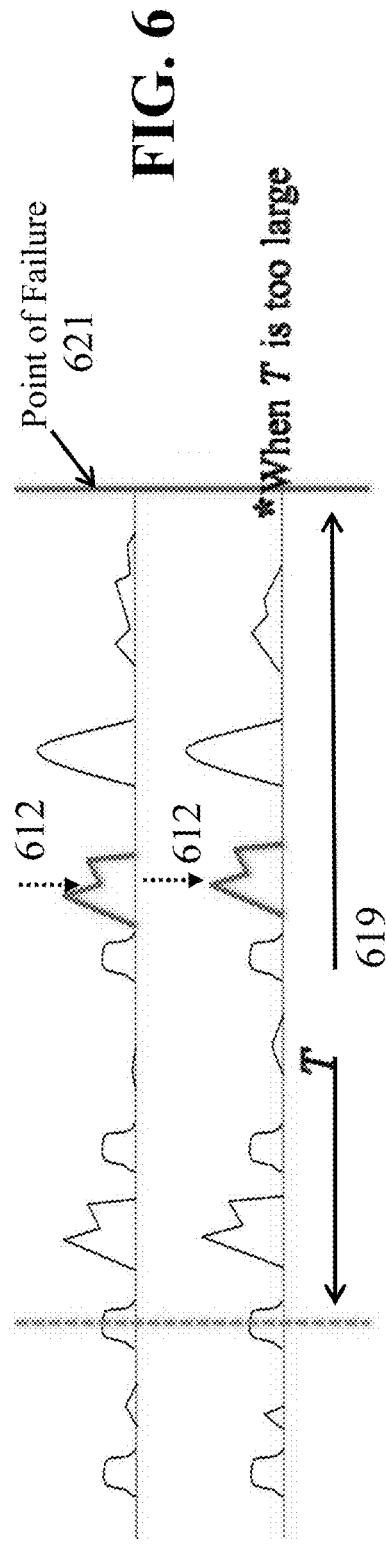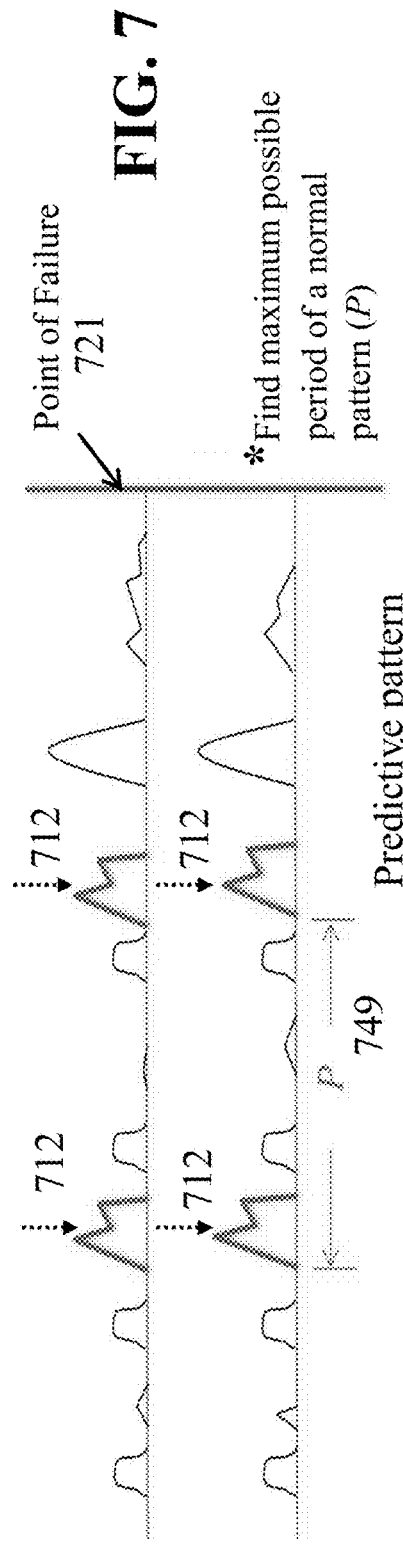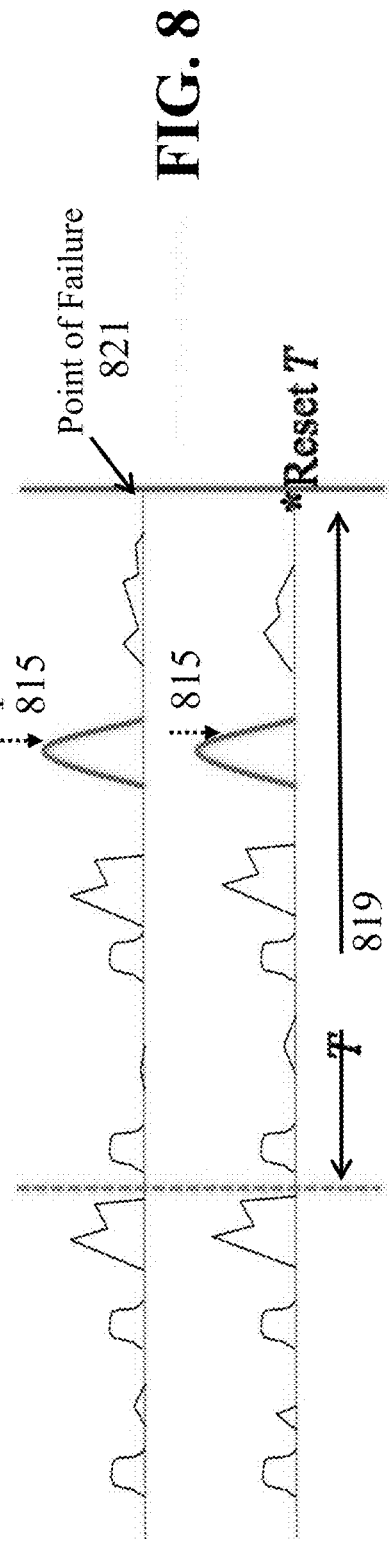

1005 Receive two test data streams from sensors being of different type from a third machine

1010 Extract a set of test data examples from each test data stream of the two test data streams

1015 Identify, based on the stored set of training data examples including the normal state region and abnormal state region for each training data example, each test data example of the two sets of test data examples of the third machine, that correspond to a stored normal state region of at least one stored training data example or at least one stored abnormal state region of at least one stored training data example, to identify a predictive pattern for each test data stream

1020 Predict a failure of the third machine by taking either one the two predictive patterns from the two test data streams of the two sensors, when compared to the stored predictive patterns in memory

FIG. 10A

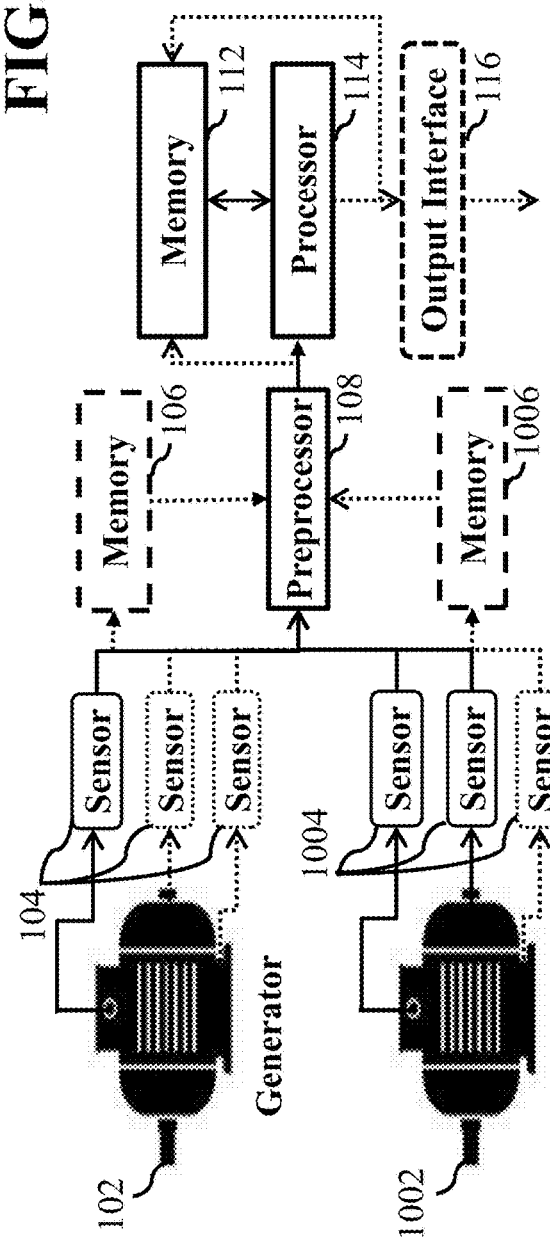

FIG. 10B

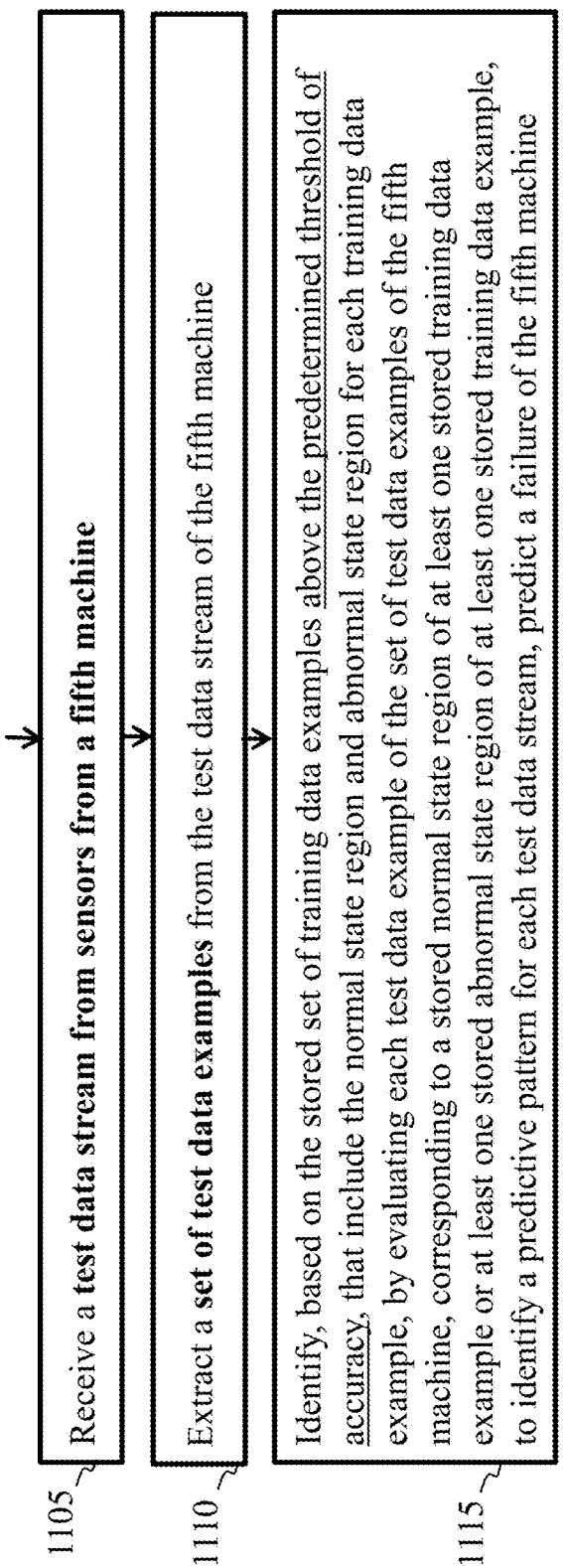

FIG. 11C

1105 — Receive a test data stream from sensors from a fifth machine

1110 — Extract a set of test data examples from the test data stream of the fifth machine 1115 — Identify, based on the stored set of training data examples above the predetermined threshold of accuracy, that include the normal state region and abnormal state region for each training data example, by evaluating each test data example of the set of test data examples of the fifth machine, corresponding to a stored normal state region of at least one stored training data example or at least one stored abnormal state region of at least one stored training data example, to identify a predictive pattern for each test data stream, predict a failure of the fifth machine

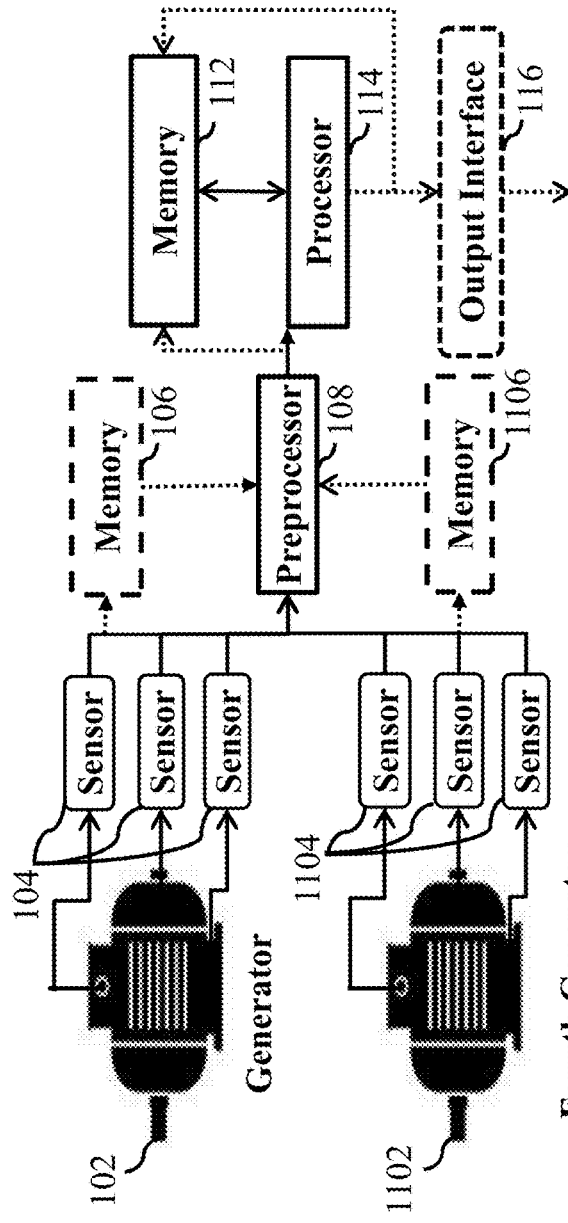

FIG. 11B

METHODS AND SYSTEMS FOR DISCOVERY OF PROGNOSTIC SUBSEQUENCES IN TIME SERIES

FIELD

The present disclosure relates generally to detection and prediction of equipment failure, and in particular, the use of time series data to detect and/or predict machine failure.

BACKGROUND

Modern computer systems collect large amounts of information from various physical systems. These physical machines are usually subjected to repetitive loads organized in regular duty cycles, and tend to wear out in a more or less regular pattern, gradually reaching a state when they fail, due to a partial or complete breakdown. Maintaining such machines in good working order is an important task associated with their operation, and how and when maintenance is performed has a very significant effect on the economic aspect of their operation. One maintenance strategy is to repair a machine only after it fails (also known as corrective maintenance). This strategy is very often not optimal at all, because repairs of an entire failed machine might be costlier than replacing a single part before the machine breaks, and also machine failure might result in wasted materials, unacceptable product quality, and might even endanger the personnel operating the machine. In situations when corrective maintenance is not a viable or economic option, a different strategy is used—regular maintenance of the machine at fixed intervals, for example one year. Examples of such safety critical machines are elevators and cars; in most parts of the world, their maintenance is done once per year, and corresponding certificates are issued. This strategy is commonly known as preventive maintenance.

Although preventive maintenance addresses the safety issues that are associated with machine maintenance, there are many cases when it is not economically optimal. The first problem with preventive maintenance is that the length of the maintenance cycle is often arbitrary (e.g., one year or one month), and has more to do with the convenience of the inspection authorities and the logistics of the inspection process (e.g. issuing inspection stickers for cars), than with the actual need of the machines. The second problem is that a single maintenance cycle could not possibly be optimal for all machines in a group, where some of the machines are new, and might require maintenance not very often, whereas older machines might require maintenance much more often.

In the machine analysis industry, sensors are typically used to measure machine parameters. As the instrumentation of machine operations increases, large amounts of data are being collected from sensors that monitor operations of the machines. The data from some sensors may also be generated at a relatively high frequency, which further results in large amounts of data. The data streams from sensors associated with machines may be analyzed to determine the state of the machine. For example, in some cases, a data stream from a sensor associated with machines may be analyzed to determine whether the machine is not performing as expected, referred to as equipment failure. An inability to rapidly process data from sensors can result in loss of information that may be indicative or predictive of machine failure. Therefore, a need exists in the art for an improved way to detect and/or predict machine failure from the large amounts of data.

SUMMARY

Some embodiments of present disclosure are based on a realization that a condition of a machine could be indicated, most generally, by information observed any time before the current moment when a prediction of the machine failure can be made. This could include any sensor reading of any observed variable at any moment in time at or before the current moment, and in addition, any ordered or unordered, contiguous or non-contiguous, set of such readings. For example, embodiments of the present disclosure include finding subsequences in a time series that have maximal predictive power about future events, such as failure of the machine. Our realization includes at least one assumption that in some time before the event, the characteristics of the time series will change as a precursor to the impending event. The change may be expressed as the emergence of one or more subsequences that were not seen before, which we identify as "predictive patterns".

In solving for this problem of detecting and predicting machine failure we had to overcome several challenges. For example, first we found analyzing the entire space of possible condition descriptions is a computationally heavy task, and furthermore, many of the possible condition descriptors in this space are not likely to correspond to typical early warning signals that might indicate a future failure. Based on this, we needed to restrict the space of condition descriptors to a much smaller subspace. In restricting the space of condition descriptors, we started by representing the condition descriptor as a time-lagged window of one or more observed variables, with a fixed window length. If such a fixed-length descriptor is adopted, a training data set can be constructed from collected historical data, where each example in the training set consists of an input vector that corresponds to the chosen condition descriptor from a point in time in the time series, and the scalar output variable is the time until failure in that time failure. This format of the training example may then be processed by using machine learning algorithms.

However, the second challenge we faced, in order to apply a fixed-length descriptor, we needed to know the correct size of the time window, which is unknown. We discovered that trying to determine the correct size of the time window is a much more difficult task to overcome than we thought. Because trying all possible sizes by fitting a separate predictive model is not practical computationally, and furthermore, it is not clear how the prediction accuracy of all models should be compared, in order to determine the best one.

We realized through experimentation that a pattern in a time series is highly predictive of future failure if we analyzed which patterns do not occur in a normal section of time series, but do occur in a section that is close to failure, i.e. abnormal time series. The methods and systems of the present disclosure maximize the margin between the closest distances observed from a candidate pattern to normal time series and those to abnormal time series. A post-processing step eliminates repetitive patterns that might occur naturally during normal operation.

In other words, based on our recognition that an abnormal region can be iteratively searched starting from the moment of failure, each iteration is able to define a specific partition into normal/abnormal regions. For example, for each iteration, a Shapelet discovery algorithm can be applied to search for the predictive pattern until the best predictive pattern is found. At least one advantage of using the Shapelet discovery algorithm is for obtaining an efficient search for the predictive pattern of different lengths. Internally, the Shapelet discovery algorithm is optimizing the predictive pattern according to predetermined measurement criteria, e.g., the predictive pattern should be as similar as possible to one pattern in the abnormal region and as different as possible from all patterns in the normal region.

However, for such a measurement criterion, we found that the procedure searching for the correct length of the normal region is limited because it will always try to minimize the length of the normal region, because the smaller normal region is less likely to include the predictive pattern (empty normal region includes no patterns at all). We noticed that if the normal region is selected incorrectly, the predicative pattern can characterize perfectly normal behavior. Thus, to overcome this other limitation, we realized that one solution is to add to the measurement criteria the condition that the predictive pattern should be present in the abnormal region only once. Which allows us to find subsequences in a time series that have maximal predictive power about future events, such as failure, among other things.

According to an embodiment of the present disclosure, a system for determining a pattern in time series data representing an operation of a machine. The system including a sensor in communication with the machine and an output interface. A computer readable memory to store and provide a set of training data examples generated by the sensor in communication with the machine. Wherein each training data example represents an operation of the machine for a period of time ending with a failure of the machine. A processor in communication with the computer readable memory, is configured to iteratively partition each training data example in the set of training data examples into a normal state region and an abnormal state region. The processor is also to determine a predictive pattern absent from the normal state regions and present in each abnormal state region only once and determine a length of the abnormal state region. Wherein each iteration includes: (1) selecting a current time series length for the abnormal state region within each training data example beginning from an estimated moment in time when the machine entered an abnormal mode of operation, and ending at the moment of failure of the machine. Wherein the current time series length is shortened starting from the start of time series to the end at the machine failure, by an increment of one-time step, per iteration, such that the current time series length is shorter than a previous current time series length for the abnormal state region selected for a previous iteration within the training data example; (2) partitioning each training data example in the set of training data examples into the normal state region and the abnormal state region having the current time series length; (3) identifying a pattern in the set of training data examples, such that the pattern is different from any other patterns present in all normal state regions of the set of training data examples, and is similar to exactly one pattern in each abnormal state region of the set of training data examples; and (4) selecting the pattern as the predictive pattern, if the pattern is found. Finally, outputting the predictive pattern via an output interface in communication with the processor or storing the predictive pattern in the computer readable memory, wherein the predictive pattern is a predictive estimate of an impending failure and assists in management of the machine.

According to another embodiment of the present disclosure, a method for determining a pattern in time series data representing an operation of a machine. The method including accessing a set of training data examples generated by a sensor in communication with the machine stored in a computer readable memory. Wherein each training data example represents an operation of the machine for a period of time ending with a failure of the machine. Iteratively partitioning, by the computer: each training data example in the set of training data examples into a normal state region and an abnormal state region; determine a predictive pattern absent from the normal state regions and present in each abnormal state region only once; and determine a length of the abnormal state region. Wherein each iteration includes: (1) selecting a current time series length for the abnormal state region within each training data example beginning from an estimated moment in time when the machine entered an abnormal mode of operation, and ending at the moment of failure of the machine. Wherein the current time series length is shortened starting from the start of time series to the end at the machine failure, by an increment of one-time step, per iteration, such that the current time series length is shorter than a previous current time series length for the abnormal state region selected for a previous iteration within the training data example; (2) partitioning each training data example in the set of training data examples into the normal state region and the abnormal state region having the current time series length; (3) identifying a pattern in the set of training data examples, such that the pattern is different from any other patterns present in all normal state regions of the set of training data examples, and is similar to exactly one pattern in each abnormal state region of the set of training data examples; and (4) selecting the pattern as the predictive pattern if the pattern is found. Finally, storing the predictive pattern in the computer readable memory in communication with the computer, or outputting the predictive pattern via an output interface in communication with the computer. Wherein the predictive pattern is a predictive estimate of an impending failure and assists in management of the machine.

According to another embodiment of the present disclosure, a non-transitory computer readable storage medium embodied thereon a program executable by a computer for performing a method. The method including accessing a set of training data examples generated by a sensor in communication with the machine stored in the non-transitory computer readable storage medium. Wherein each training data example represents an operation of the machine for a period of time ending with a failure of the machine. Iteratively partitioning, by the computer, in communication with the non-transitory computer readable storage medium: each training data example in the set of training data examples into a normal state region and an abnormal state region; determine a predictive pattern absent from the normal state regions and present in each abnormal state region only once; and determine a length of the abnormal state region. Wherein each iteration includes: (1) selecting a current time series length for the abnormal state region within each training data example beginning from an estimated moment in time when the machine entered an abnormal mode of operation, and ending at the moment of failure of the machine. Wherein the current time series length is shortened starting from the start of time series to the end at the machine failure, by an increment of one-time step, per iteration, such that the current time series length is shorter than a previous current time series length for the abnormal state region selected for a previous iteration within the training data example; (2) partitioning each training data example in the set of training data examples into the normal state region and the abnormal state region having the current time series length; (3) identifying a pattern in the set of training data examples, such that the pattern is different from any other patterns present in all normal state regions of the set of training data examples, and is similar to exactly one pattern in each abnormal state region of the set of training data examples; and (4) selecting the pattern as the predictive pattern, if the pattern is found. Finally, storing the predictive pattern in the non-transitory computer readable storage medium or outputting the predictive pattern via an output interface in communication with the computer, wherein the predictive pattern is a predictive estimate of an impending failure and assists in management of the machine.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 6 is a graph illustrating when T is unknown, and using an algorithm based on the MDL concept to determine a suitable T, FIG. 6 shows when T is too large, according to embodiments of the present disclosure;

FIG. 7 is a graph illustrating finding the maximum possible period of a normal pattern, according to embodiments of the present disclosure;

FIG. 8 is a graph illustrating resetting T, according to embodiments of the present disclosure;

FIG. 10A is a block diagram illustrating the steps of another embodiment incorporating test data streams from sensors being of different types from a third machine, using the previously stored predictive patterns, compared to the identified two predictive patterns of the third machine, to predict a failure of the third machine, according to an embodiment of the present disclosure;

FIG. 10B is a block diagram illustrating components of the system of FIG. 10A, according to an embodiment of the present disclosure;

FIG. 11B is a block diagram illustrating components of the system of FIG. 11A, according to an embodiment of the present disclosure;

FIG. 11C is a block diagram illustrating components of the system of FIG. 11A, according to an embodiment of the present disclosure;

Figure 1A:
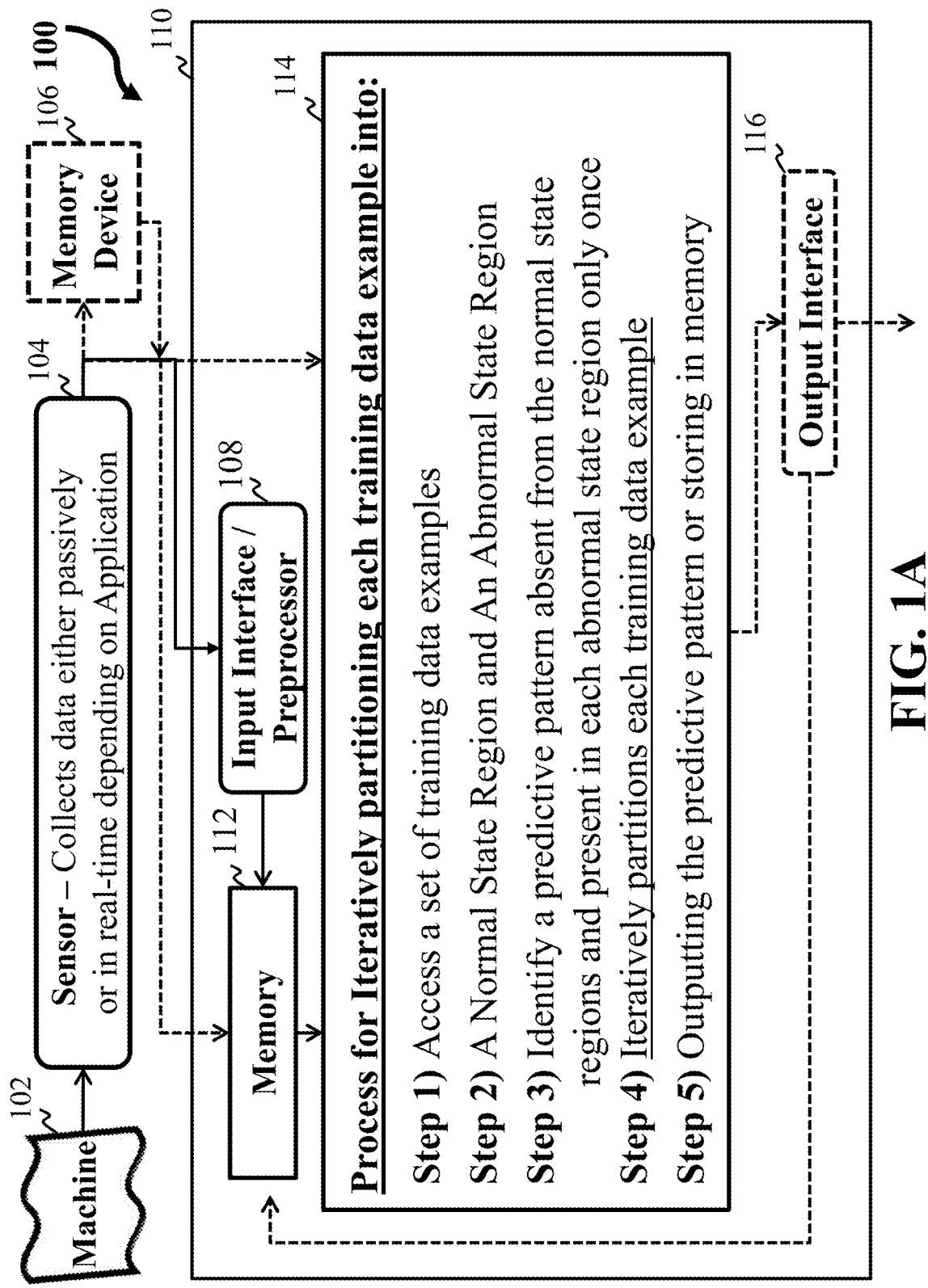
FIG. 1A is a block diagram illustrating the system for determining a pattern in time series data representing an operation of a machine, according to an embodiment of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Definition of Terms

According to the definition of terms with regard to the present disclosure, the term Shapelet can be defined as a characteristic subsequence of a time series that helps distinguish the class that this time series belongs to.

Overview of Embodiments of the Present Disclosure

Figure 1B:
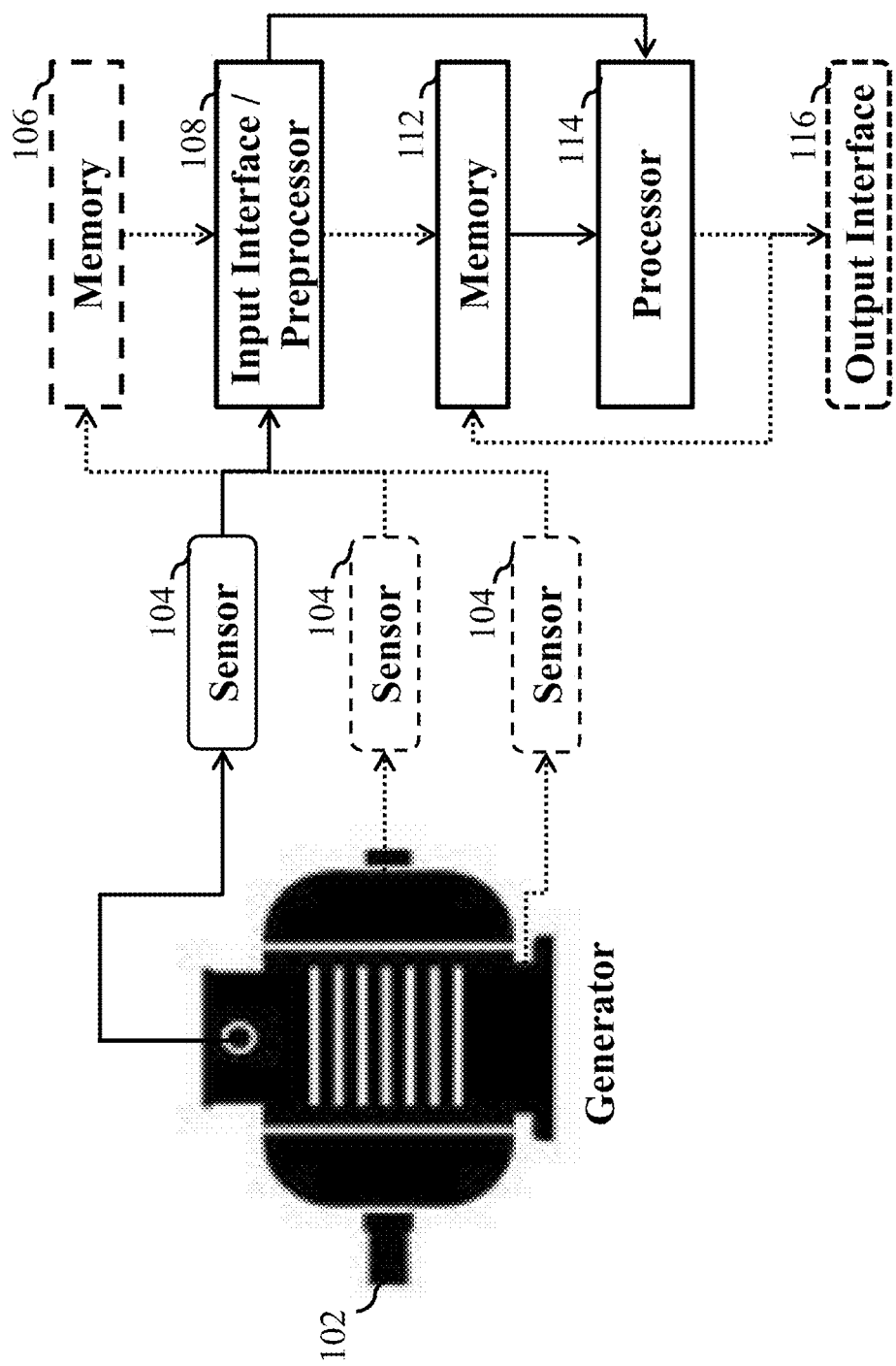
FIG. 1B is a block diagram illustrating components of the system of FIG. 1A, according to an embodiment of the present disclosure.

FIG. 1A and FIG. 1B are block diagrams illustrating system 100 for determining a pattern in time series data representing an operation of a machine, i.e. generator 102, according to an embodiment of the present disclosure. The system 100 includes a sensor 104 in communication with the machine 102. A computer readable memory 112 to store and provide a set of training data examples generated by the sensor 104 in communication with the machine 102. Wherein each training data example represents an operation of the machine 102 for a period of time ending with a failure of the machine 102. The sensors 104 collect operational data of the machine 102 that can be stored in memory 106 or directly to an input interface/preprocessor 108, and then sent to the processor 114. Upon being processed the data is either stored in memory 112 or outputted via the output interface 116.

At least one realization of the present disclosure is based on finding subsequences in a time series that have maximal predictive power about future events, such as failure. At least one underlying assumption is that in some time T before the event, the characteristics of the time series will change as a precursor to the impending event. The change can be expressed as the emergence of one or more subsequences that were not seen before. This is defined or called such subsequences as "predictive patterns", as noted above.

Still referring to FIG. 1A and FIG. 1B, if T is known, the problem can be reduced to a supervised learning problem, where the system state can be regarded abnormal within time T before failure, and normal for the rest of the time. The objective is to learn a classifier that distinguishes between normal and abnormal states. However, the actual state of health of the system is typically not observable, we assume that it is manifested by some detectable predictive patterns. Shapelet discovery algorithms can be applied to the problem without modification if there is only one predictive pattern in every time series. But in real life systems this is not always true. We would like to detect as much predictive patterns as possible, so that we may be able to predict failure early. Moreover, our ultimate goal is not to classify, but to predict the occurrence of failure in time series by examining whether the predictive patterns match some part of the time series. Shapelet discovery algorithm does not always guarantee such kind of "match". We have thus designed a Maximal Margin Algorithm which is able to find all predictive patterns that appear in two or more time series before failure. To accelerate the search, we have designed an upper bound which is capable of pruning out more than 60% of the data in our experiment.

However, in most cases T is actually unknown, which greatly exacerbates the problem. If we guess too small a value of T, we may dismiss the predictive pattern. If our guess of T is too large, the search space grows quadratically, and we will very likely find spurious normal patterns simply because those patterns do not have enough time to show up before our guessed system change point. For example, assume length of the time series is N, and T is much larger than N/2, then we may find a lot of subsequences of length N−T that perfectly distinguish the normal and abnormal states, as long as the subsequences do not appear right at the beginning of the time series.

To maximize the opportunity of finding useful predictive patterns and to avoid finding spurious rules, we have designed an algorithm based on the Minimum Description Length concept to help determine a suitable T.

Still referring to FIG. 1A and FIG. 1B, if we assume T is known, the system state can be regarded abnormal within time T before failure, and normal for the rest of the time. The objective is to learn subsequences that can be used to distinguish between normal and abnormal states. Although the actual state of health of the system is typically not observable, we assume that it is manifested by some detectable predictive patterns.

If we treat this as a classification problem, we will find that a Shapelet discovery algorithm is directly applicable. However, a Shapelet discovery algorithm, or other classification algorithms would terminate when they find only the smallest set of subsequences to differentiate abnormal regions from normal regions, while in real life systems, there can be a lot more predictive patterns than the smallest set. Discovering all these patterns is desirable in our problem setting, as in that way we will be able to make earlier and more accurate predictions. Besides, classification algorithms cannot always guarantee the "appearance" of certain patterns, because the class splitting points/boundaries can be very far away from class centers. So classification algorithms do not fit our needs here.

However, before discussing finding predictive patterns, we first need to formally define a way to measure the predictive power of a time series subsequence. In general, we want the predictive pattern to: (A) be a subsequence in the abnormal region of a time series; (B) be very different from any subsequences in the normal region of any time series; and (C) be very similar to at least one subsequence in the abnormal region of another time series.

Conditions (A) and (B) can be intuitive. Condition (C) is also necessary because if the pattern only appears in one-time series, it is very possibly noise, and we cannot generalize it as a predictive rule. So the more time series we have in the dataset, the better.

Figure 1C:
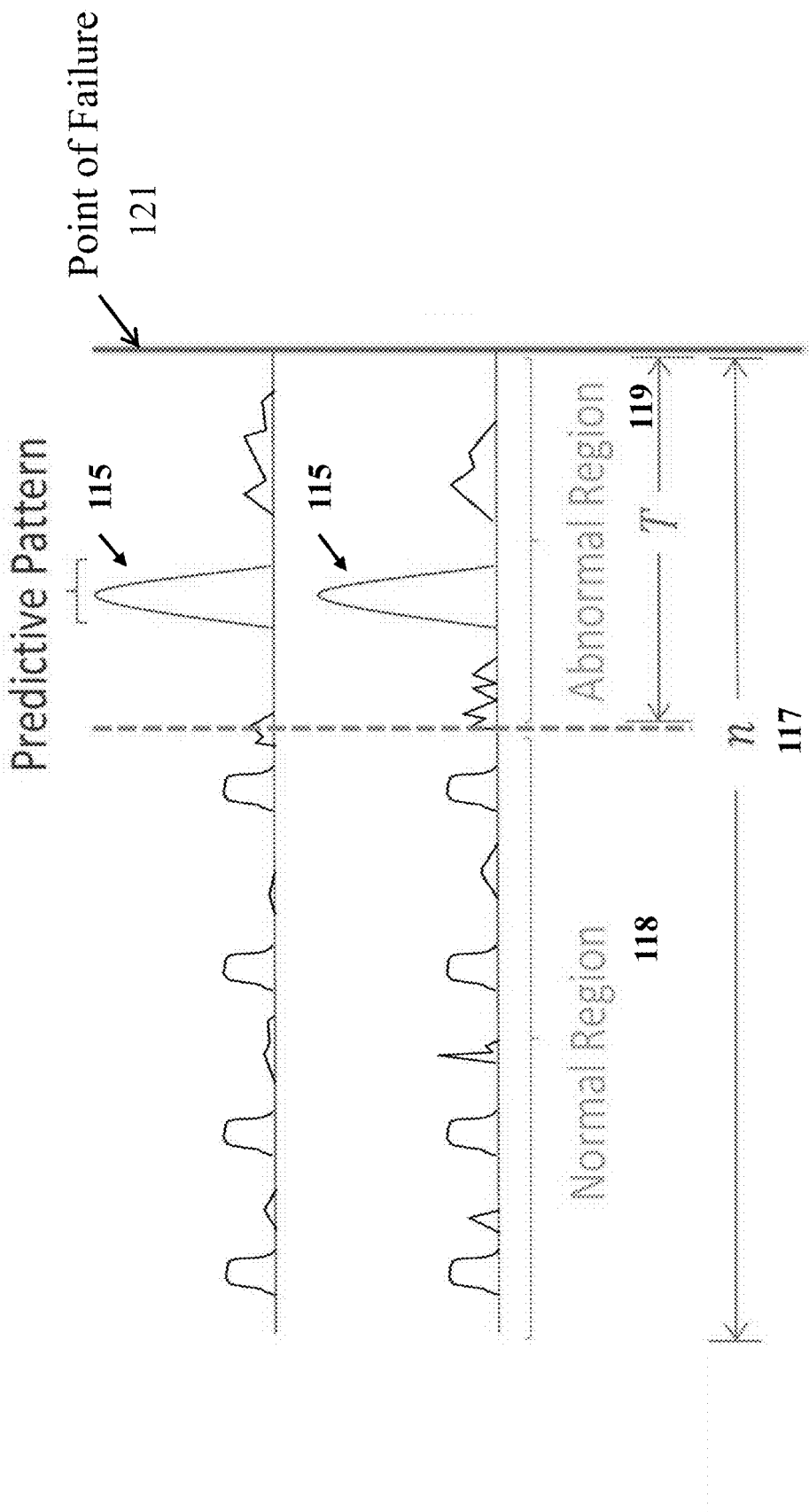
FIG. 1C is a graph illustrating a predictive pattern in real-valued time series of FIG. 1A, according to an embodiment of the present disclosure.

FIG. 1C is a graph illustrating a predictive pattern 115 in real-valued time series of FIG. 1A, according to an embodiment of the present disclosure. Wherein aspects of the graph are labeled as, predictive pattern 1—115, "n"—417, normal region—118, abnormal region T—119 and the point of failure—121.

Wherein, FIG. 1C shows an example of the problem in real-valued space. The subsequence (i.e. labeled as "predictive pattern") 115 of FIG. 1C is the only subsequence that conforms to all three conditions, and is the predictive pattern we are looking to identify.

So, how can we learn how to identify the subsequences that can be used to distinguish between normal and abnormal states and not obtain a pattern that is possibly noise, and end with a result that measures the predicting power of a time series subsequence, i.e. identifies the predictive pattern(s) in the set of training data examples?

The system of the present disclosure initially starts (i.e. Step 1 of FIG. 1A) by accessing a set of training data examples and selecting an initial current time series length for the abnormal state region within each training data example beginning from an estimated moment in time when the machine entered an abnormal mode of operation, and ending at the moment of failure of the machine. Note that a predictive pattern candidate can be of various lengths. For now, we assume the length is a fixed value or an initial current times series length, and assume we have a dataset of n time series or for example "n" 117 of FIG. 1C. Remember, as noted above, we assume T is known, so the system state can be regarded abnormal within time T before failure, and normal for the rest of the time. Again, the objective is to learn subsequences that can be used to distinguish between normal and abnormal states. Although the actual state of health of the system is typically not observable, we assume that it is manifested by some detectable predictive patterns.

Step 2 of FIG. 1A, includes partitioning each training data example into a normal state region and abnormal state region. As noted above, since we know T, we can split the whole dataset into a normal data set with the normal region of all time series and an abnormal dataset with the abnormal region of all time series.

Step 3 of FIG. 1A, includes identifying a pattern in the set of training data examples, wherein the pattern is different from any other patterns present in all normal state regions of the set of training data examples, and is similar to exactly one pattern in each abnormal state region of the set of training data examples. However, how different is "very different", and how similar is a "match"?

Step 4 of FIG. 1A, includes iteratively partitionings of each training data example, that includes shortening the current time series length, by an increment of one-time step, per iteration, so the current time series length is shorter than a previous current time series length for the abnormal state region selected for a previous iteration within the training data example. At least one aspect includes that only the abnormal region is shortened by one-time step, which implies that the normal region is correspondingly grown by one-time step. The overall duration of the time series that is used as a training example remains the same in all iterations, and is only partitioned differently from iteration to iteration.

Step 5 of FIG. 1A, includes selecting the pattern as the predictive pattern, if the pattern is found. Finally, FIG. 1A and FIG. 1B illustrate outputting the predictive pattern via an output interface 116 in communication with the processor 114 or storing the predictive pattern in the computer readable memory 112, wherein the predictive pattern is a predictive estimate of an impending failure of the machine 102 and assists in management of the machine 102.

Thus, FIG. 1C illustrates the predictive pattern 115 in real-valued time series of FIG. 1A, according to the present disclosure. Wherein, FIG. 1C shows an example of the problem in real-valued space, and the subsequence (i.e. labeled as "predictive pattern") 115 of FIG. 1C is the only subsequence that conforms to all three conditions, and is the predictive pattern we are looking to identify. Remember, the three conditions include: (A) be a subsequence in the abnormal region of a time series; (B) be very different with any subsequences in the normal region of any time series; and (C) be very similar to at least one subsequence in the abnormal region of another time series. Which can be expressed another way as: identifying the pattern that is different from any other patterns present in all normal state regions of the set of training data examples, and is similar to exactly one pattern in each abnormal state region of the set of training data examples, i.e. the predictive pattern 115 of FIG. 1C.

Aspects of Components of the Present Disclosure

Referring to FIG. 1B, the components may provide for additional features of the present disclosure. For example, the processor 114 may be part of a computer 110, i.e. computer or processor, wherein the computer 110 can include an input interface 108 to receive the training data from the sensor 104 and/or receive the training data from possibly an external memory device 106. Wherein the external memory device 106 stores the training data generated by the sensor 104 from the operation of the machine 102. However, it is possible that the system is based on real-time, such that the sensor 104 may be directly in communication with one of the input interface 108, memory 112 or processor 114, depending upon the specific needs of the system, user of the system, requiring a specific operational configuration of the system. Further, the sensor 104 may generate data that includes parameters, such that each parameter can relate to the operation of the machine including one or a combination of: fluid force data, fluid energy data, vibration data, temperature data, voltage data or current data.

Still referring to FIG. 1B, the sensors 104 may continually measure electrical properties of the machine and provide streams of sensor data, which may be stored and/or processed onsite or relayed to another location. The sensors 104 can measure/sense a parameter such as pressure of machine or other measurable like parameters. For example, the sensors 104 may sample the parameters from the machine 102 at an interval of once per day during one week and at a different interval during another week. Further, timing information identifying the entry time, date and time, of the training data stream into the memory 112 can be included in the memory 112. Also, timing information for use in identifying invalid data in the training data streams may be stored in the memory 112. For example, invalid data may be a result of a failed sensor.

Still referring to FIG. 1B, it is contemplated the individual machines may be from the group consisting of elevators, cars, air conditioners, electrical motors, generators, etc., and even entire factories. Further, it is possible the time series data is data gathered from an organ of an animal, such as a human, that provides an electrical pattern that may be monitored or recorded via the sensor 104, so data may be obtained and processed by the system 100 of the present disclosure.

Still referring to FIG. 1B, the input interface/preprocessor 108 can be configured to detect failed sensors upon receiving data from the sensor, wherein if the sensor is determined to be failed, any data associated with the failed sensor during a specific time period may be removed. It is possible the input interface/preprocessor 108 may extract the training data examples only from portions of the training data stream that do not include invalid data (invalid data referring to, for example, training data generated while the sensor was malfunctioning) based on information, i.e. timing or other information, that is provided along with the training data stream. The input interface/preprocessor 108 may also consider training data stored in the memory 112 for a long time, over a pre-specified by a user of a period of time, day(s), etc., after generation of the training data stream by the sensor 104 as invalid and exclude portions of the training data stream that include such data. The interface/preprocessor 108 may perform the extraction of the training data examples, such that the overlap between adjacent training data segments is adequate to reduce unwanted redundancy of the data between adjacent training data segments. It is noted, the overlap between adjacent training data examples can be set or limited to a maximum of about 10%, 30%, 40%, 50%, 60%, 70% or 80%, or some increment between 10% and 80%, such as 15%, 25%, 35%, etc.

An Embodiment of the Steps of the Present Disclosure

Figure 1D:
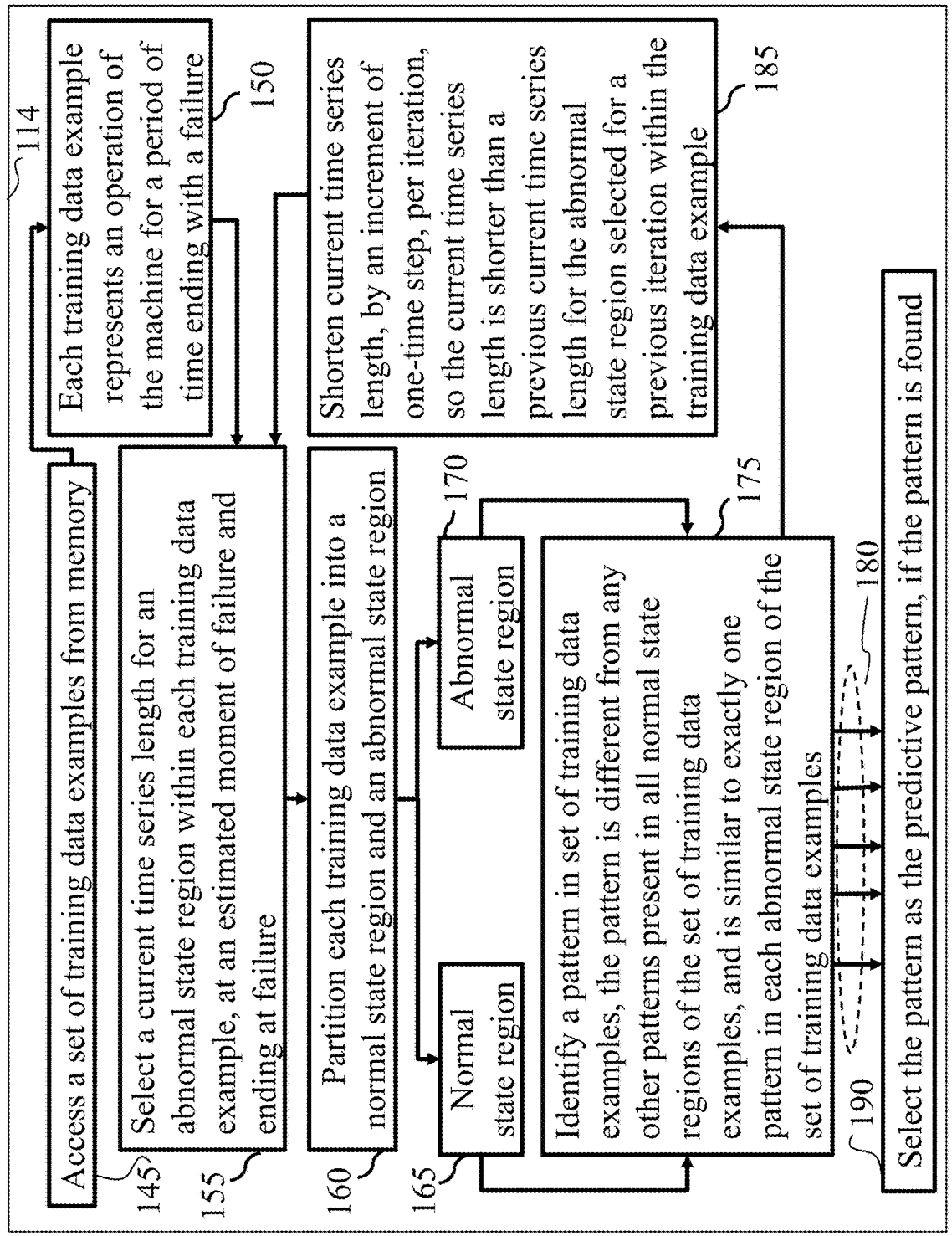
FIG. 1D is a block diagram illustrating the system steps of FIG. 1A, for determining the pattern in the time series data representing the operation of the machine, according to an embodiment of the present disclosure.

FIG. 1D is a block diagram illustrating the system steps of FIG. 1A and FIG. 1B, for determining the pattern in the time series data representing the operation of the machine, according to an embodiment of the present disclosure.

Referring to steps 145 and 150 of FIG. 1D, step 145 includes accessing the memory 112 to acquire the set of training data examples. Step 150 defines that each training data example of the set of training data examples represents an operation of the machine 102 for a period of time ending with a failure.

Step 155 of FIG. 1D includes selecting a current time series length for an abnormal state region within each training data example, at an estimated moment of failure and ending at failure. For example, assume length of the time series is N, and T is much larger than N/2, then we may find a lot of subsequences of length N−T that perfectly distinguish the normal and abnormal states, as long as the subsequences do not appear right at the beginning of the time series.

Step 160 of FIG. 1D includes partitioning each training data example into a normal state region and an abnormal state region. It is noted that the periods of time for the set of training data examples can be one of: the same period of time or some training data examples in the set of training data examples have periods of time that are different from other training data example periods of time in the set of training data examples. Further, each training data example in the set of training data examples can be sampled at a regular sampling rate or an approximate same period of time, for the set of training data examples.

Step 165 of FIG. 1D includes data specific to the normal state region, such that the normal state region includes normal operation of the machine without any signs of failure of the machine. Note that a predictive pattern candidate can be of various lengths. For now we assume the length is a fixed value 1. Assume we have a dataset of n time series: $D=\{D_1, D_2, \ldots, D_n\}$. Since we know T, we can split the whole dataset into a normal data set $D_{normal}=\{D_{1,normal}, D_{2,normal}, \ldots, D_{n,normal}\}$ with the normal region of all time series. As noted above, the processor partitions each training data example in the set of training data examples into the normal state region based on data identifying a portion of the training data example that is generated by sensors of machine while the machine was operating normally, and partitions each training data example in the set of training data examples into the abnormal state region based on data identifying a portion of the training data example that is generated by sensors of machine while the machine was failing to operate normally and ending with the failure of the machine.

Step 170 of FIG. 1D includes data specific to the abnormal state region, such that the abnormal state region corresponds to the machine failing to operate normally ending with the failure of the machine. Further, the current time series length of the abnormal state region is an amount of discrete-time data within the abnormal state region of each training data example in the set of training data examples. For example, since we know T, we can split the whole dataset into an abnormal dataset $D_{abnormal}=\{D_{1,abnormal}, D_{2,abnormal}, \ldots D_{n,abnormal}\}$ with the abnormal region of all time series. Assume we have a candidate $S_{i,j}$, which is a subsequence of $D_{i,abnormal}$, the abnormal region of the ith time series. $S_{i,j}$ starts at the jth data point of $D_{i,abnormal}$ and is of length l. Assume the nearest neighbor of $S_{i,j}$ in $D_{normal}$ is $NN_{S_{i,j},normal}$ with a distance of $dist_{S_{i,j},normal}$, and the nearest neighbor of $S_{i,j}$ in $D_{i,abnormal}=D_{abnormal}-\{D_{i,abnormal}\}$ is $NN_{S_{i,j},abnormal}$ With a distance of $dist_{S_{i,j},abnormal}$ Then we would like to find a subsequence $S_{i,j}$ that maximizes $dist_{S_{i,j},normal}$ and minimizes $dist_{S_{i,j},normal}$. However, usually it is not possible to do both the maximization and minimization at the same time. So, as a reasonable approximation to this, we define the predictive pattern candidate of length l to be a subsequence $S_{i,j}$, starting at the jth data point of $D_{i,abnormal}$, such that $$S_{i,j} = \underset{s_{i,j}}{\mathrm{argmax}}(dist_{S_{i,j},normal} - dist_{S_{i,j},abnormal}).$$

Further, the predictive pattern is different from a pattern in the normal region, if a Euclidean distance between the two patterns exceeds a pre-specified threshold. Further still, the predictive pattern is considered similar to a pattern in the normal region if a Euclidean distance between the two patterns is lower than a pre-specified threshold.

Step 175 of FIG. 1D includes identifying a pattern in set of training data examples, such that the pattern is different from any other patterns present in all normal state regions of the set of training data examples, and is similar to exactly one pattern in each abnormal state region of the set of training data examples. For example, we define $dist_{S_{i,j},normal} - dist_{S_{i,j},abnormal}$ as the margin of $S_{i,j}$, and the algorithm to find the predictive pattern candidate of a fixed length l is called the Maximal Margin Algorithm. Noted is that the searching for the predictive pattern can be performed by a fast shapelet discovery algorithm.

Referring to step 180 and step 185 of FIG. 1D, step 180 includes the iteratively partitions each training data example, and step 185 includes shortening the current time series length, by an increment of one-time step, per iteration, so the current time series length is shorter than a previous current time series length for the abnormal state region selected for a previous iteration within the training data example. As noted above, at least one aspect includes that only the abnormal region is shortened by one-time step, which implies that the normal region is correspondingly grown by one-time step. The overall duration of the time series that is used as a training example remains the same in all iterations, and is only partitioned differently from iteration to iteration.

Step 190 of FIG. 1D includes selecting the pattern as the predictive pattern, if the pattern is found. It is possible that the particular above steps may not have to be in the sequence as describe above, but some other sequence, depending upon the application.

Maximal Margin Algorithm

Figure 2:
FIG. 2 is a graph illustrating using a brute force maximal margin algorithm for finding a maximal margin of subsequences (maxbound), according to an embodiment of the present disclosure.

FIG. 2 is a graph illustrating using a brute force maximal margin algorithm for finding a maximal margin of subsequences (maxbound), according to embodiments of the present disclosure. Wherein "R" 205 represents a randomly selected subsequence in the abnormal data set, "S" 210 represents a candidate predictive subsequence in the abnormal data set, $RNN_n$ 215 represents the most similar subsequence to R in the normal data set, and $SNN_n$ 220 represents the most similar subsequence to S in the normal data set. Similarity here is defined in terms of a suitably chosen distance measure, for example the Euclidean distance dist(R, S)=$\sqrt{\sum_{i=1}^{l}(R_i-S_i)^2}$ between two subsequences of the same length l.

If we use a brute force maximal margin algorithm, we will need to search for all subsequences of length l in $D_{abnormal}$, and for every subsequence $S_{i,j}$, we need to find its nearest neighbor in both $D_{normal}$ and $D_{i,abnormal}$. If we assume the number of time series in the data set is n and the maximum length of each time series is m, then the complexity of the algorithm is $O(m^2n^2l)$. Even if we use smarter tricks to accelerate evaluation of Euclidean distance so to factor out the complexity by O(l), it is still $O(m^2n^2)$. If we are searching for subsequences of all lengths, the complexity becomes $O(m^3n^2)$, which is intractable if the dataset is large.

The nearest neighbor search of each subsequence has a complexity O(mn). If we can lower that complexity for a large portion of subsequences in the dataset, the algorithm can be largely accelerated. So instead of using a brute force algorithm, here we introduce a novel upper bound for the maximal margin of subsequences. If the upper bound exceeds the best-so-far margin, we can simply prune the subsequence out and avoid looking for nearest neighbors.

Since the margin of $S_{i,j}$ is $dist_{S_{i,j},normal}-dist_{S_{i,j},abnormal}$, we can get an upper bound for $dist_{S_{i,j},normal}$ and an lower bound for $dist_{S_{i,j},abnormal}$ independently. We use Maxbound to represent the upper bound of $dist_{S_{i,j},normal}$, and Minbound to represent the lower bound of $dist_{S_{i,j},abnormal}$. Then the upper bound for the margin of $S_{i,j}$ is Maxbound−Minbound.

Suppose our current candidate is $S=S_{i,j}$, which is a subsequence in $D_{i,abnormal}$. We have a random subsequence R≠S in $D_{i,abnormal}$. The nearest neighbor of R in $D_{normal}$ is $RNN_n$, and that of S is $SNN_n$, as is shown in FIG. 2. Then we have dist(S, $SNN_n$)≤dist(S, $RNN_n$). If we have a fixed number of such random subsequences $R_1, R_2, \ldots, R_p$ in $D_{i,abnormal}$, then we have dist(S, $SNN_n$)≤min(dist(S, $RNN_n$)). This gives us the Maxbound of S.

Figure 3:
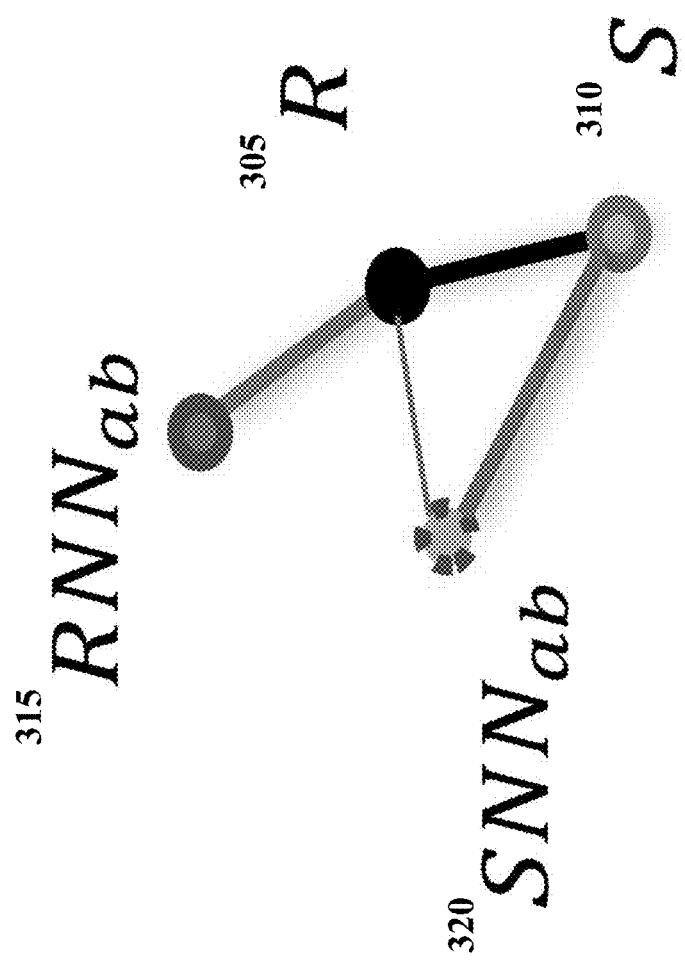
FIG. 3 is a graph illustrating using a brute force minimal margin algorithm for finding a minimal margin of subsequences (minbound), according to embodiments of the present disclosure.

FIG. 3 is a graph illustrating using an algorithm for finding a minimal margin of subsequences (minbound), according to embodiments of the present disclosure. Wherein "R" 305 represents a randomly selected subsequence of the abnormal data set, "S" 310 represents a candidate predictive subsequence of the abnormal data set, $RNN_{ab}$ 315 represents the closest subsequence to R in the abnormal data set, and $SNN_{ab}$ 320 represents the closest subsequence to S in the abnormal data set.

Now suppose the nearest neighbor of R in $D_{i,abnormal}$ is $RNN_{ab}$, and that of S is $SNN_{ab}$, as is shown in FIG. 3. Then we have dist(S, $SNN_{ab}$)≥dist(R, $SNN_{ab}$)−dist(R, S)≥dist(R, $RNN_{ab}$)−dist(R, S). If we have a fixed number of such random subsequences $R_1, R_2, \ldots, R_p$ in $D_{i,abnormal}$, then we have dist(S, $SNN_{ab}$)≥max(dist(R, $RNN_{ab}$)−dist(R, S)). This gives us the Minbound of S. Now we have an upper bound for the margin of S: dist(S, $SNN_n$)−dist(S, $SNN_{ab}$)≤Maxbound−Minbound.

Table 1 shows the smart maximal margin algorithm accelerated by the upper bound. The algorithm takes the dataset D, a fixed T, length of the candidate subsequence l and the number of random subsequences R as inputs, then outputs the predictive pattern PP with maximal margin, its nearest neighbor in abnormal region $PP_{nn}$, and the maximal margin value MM.

TABLE 1

Maximal Margin Algorithm

Algorithm 1 Maximal Margin (D, T , l, R)
Input: D: dataset; T: length of abnormal region, l: subsequence length, R: number of random selections
Output: PP: Predictive Pattern with Maximal Margin; $PP_{nn}$: nearest neighbor of predictive pattern in abnormal region; MM: maximal margin value.
1: Dnorm ←◊, Dabnorm ←◊
2: for i ← 1 to |D| do //every time series in D
    m = |D(i)| //length of the ith time series
3: Dnorm(i) ← D(i,1:m − T + l − 1), Dabnorm(i) ← D(i,m − T + 1:m)
4: end for
    MM← 0, PP ←◊, $PP_{nn}$ ←◊
5: for i ← 1 to |Dabnorm| do
6:   RD ← Randomselect(Dabnorm(i),R,l) //random select R subsequences of length l
7:     $RNN_n$ ←◊, $Rdist_{ab}$ ←◊
8:     for j ← 1 to R do
        ($RNN_n$(j),$dist_n$)← FindNN(RD(j),Dnorm,inf)
9:     Dabnorm_other ←all time series in Dabnorm except the one that includes RD(j)
10:     ($RNN_{ab}$,$dist_{ab}$)← FindNN(RD(j),Dabnorm_other,inf)
11:     $Rdist_{ab}$(j)← $dist_{ab}$
12:     if  $dist_n$ − $dist_{ab}$ > MM then
        MM ← $dist_n$ − $dist_{ab}$, PP ← RD(j),$PP_{nn}$ ← $RNN_{ab}$ //update

TABLE 1-continued

Maximal Margin Algorithm

```
13:       maximal margin
14:      end if
       end for
15:   for j ← 1 to |Dabnorm(i)| − l + 1 do
              S ← Dabnorm(i,j:j + l − 1)  //search for every candidate subsequence
16:      if S is not in RD then
17:          Maxb ← CalculateMaxbound(S,RNN$_n$)
              Minb ← CalculateMinbound(S,RD,Rdist$_{ab}$)
18:          if Maxb − Minb ≤ MM then  //upper bound of the margin
19:             continue
20:          end if
              (NN$_n$,dist$_n$)← FindNN(S,Dnorm,Maxb)
21:          if dist$_n$ − Minb ≤ MM then  // a tighter upper bound of the margin
                 continue
22:          end if
              (NN$_{ab}$,dist$_{ab}$)← FindNN(S,Dnorm,Minb)
23:          if dist$_n$ − dist$_{ab}$ > MM then
24:             MM ← dist$_n$ − dist$_{ab}$, PP ← S, P$_{nn}$ ← NN$_{ab}$  //update
       maximal margin
25:          end if
26:      end if
27:   end for
       end for
28:   return PP, MM
29:
```

Lines 1-5 divides the whole dataset into a normal dataset and an abnormal dataset according to T. Lines 8-17 randomly choose R subsequence of length l in the ith abnormal time series and find their nearest neighbors in both in $D_{normal}$ and $D_{i,abnormal}$. The nearest neighbor search algorithm of FindNN is described in. Lines 19-36 search for a subsequence S of length l in the ith abnormal time series with maximal margin. Lines 22 and 23 calculate Maxbound and Minbound of S, respectively. Calculate Maxbound is shown in Table 2 and Calculate Minbound in Table 3. The ED function in line 3 of both algorithms evaluates the Euclidian distance between two subsequences.

TABLE 2

Maxbound Algorithm

Algorithm 2 Calculate Maxbound (S,RNN$_n$)
Input: S: subsequence candidate; RNN$_n$: Nearest Neighbors of random subsequences in normal region.
Output: Maxb: upper bound of distance between S and its nearest neighbor in normal region

```
1:   S ← Znormalize(S), Maxb ← inf
2:   for i ← 1 to |RNN$_n$| do  //every random subsequence
         RS ← Znormalize(RNN$_n$(i)), distance ← ED(S,RS)
3:       if dist < Maxb then
             Maxb ← Distance
4:       end if
5:   end for
6:   return Maxb
```

TABLE 3

Minbound Algorithm

Algorithm 2 Calculate Minbound (S,RD,Rdist$_{ab}$)
Input: S: subsequence candidate; RD: random subsequences, Rdist$_{ab}$: Distances between random subsequences and their nearest neighbor in the abnormal region
Output: Minb: lower bound of distance between S and its nearest neighbor in abnormal region

```
1:   S ← Znormalize(S), Minb ← −inf
2:   for i ← 1 to |RD| do  //every random subsequence
         RS ← Znormalize(RD(i)), dist ← ED(S,RS)
3:       if Rdist$_{ab}$(i) − dist > Minb then
             Minb ← dist
4:       end if
5:   end for
6:   return Minb
```

The upper bound of the margin evaluated by Maxbound and Minbound largely accelerates the maximal margin algorithm. Experiments so far show a speed up of more than one magnitude.

Selecting the Best Predictive Pattern of all Lengths

The maximal margin algorithm shows us how to find the best predictive pattern of a fixed length l. Since l is not given in a time series, we need to search for all possible lengths, and define a measure of maximal margin which is invariant of length. Here we simply select the subsequence with length $$l = \underset{l}{\operatorname{argmin}}(MM_l / \sqrt{l}).$$

Finding all Possible Predictive Patterns by MDL

Figure 4:
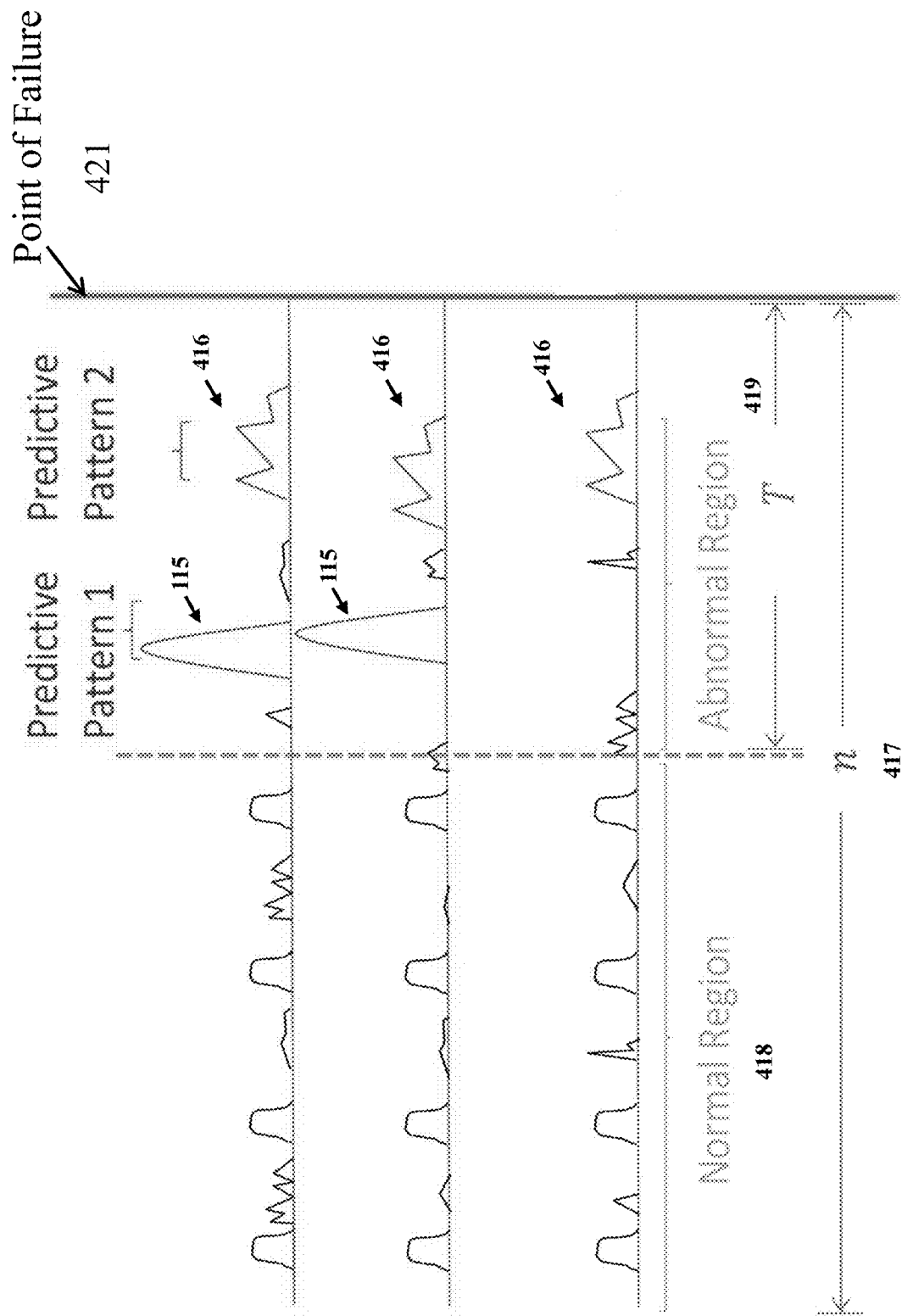
FIG. 4 is a graph illustrating the search for all possible predictive patterns, according to embodiments of the present disclosure.

FIG. 4 is a graph illustrating all possible predictive patterns by using a Minimal Description Length (MDL), according to embodiments of the present disclosure. Wherein aspects of the graph are labeled as, predictive pattern 1—115, the second predictive pattern—416, "n"—417, normal region—418, abnormal region T—419 and the point of failure—421.

Up to now, we have a method to find the most predictive pattern in a data set of Run-to-Failure time series. But sometimes there can be more than one predictive pattern in the time series. For example, FIG. 4 shows when a machine of several sections breaks down, we may first detect time series subsequences indicating the cracking of section 1, then another time series subsequence indicating the cracking of section 2, etc.

Also note that the maximal margin algorithm only selects a pair of similar subsequences in the abnormal region, so they are related to only two time series. If there are more than two time series, we will need to find a "match" of the predictive pattern in the rest time series as well.

Still referring to FIG. 4, it is very hard for to find two subsequences in a dataset that are exactly the same, since there is always noise in the signal. One may think of setting up distance thresholds to differentiate "match" and "not match", but there is no formal way to set such kind of threshold. Also, given the large variety of subsequence lengths, shapes, etc., we would need to define numerous such thresholds, which is not feasible.

Figure 5:
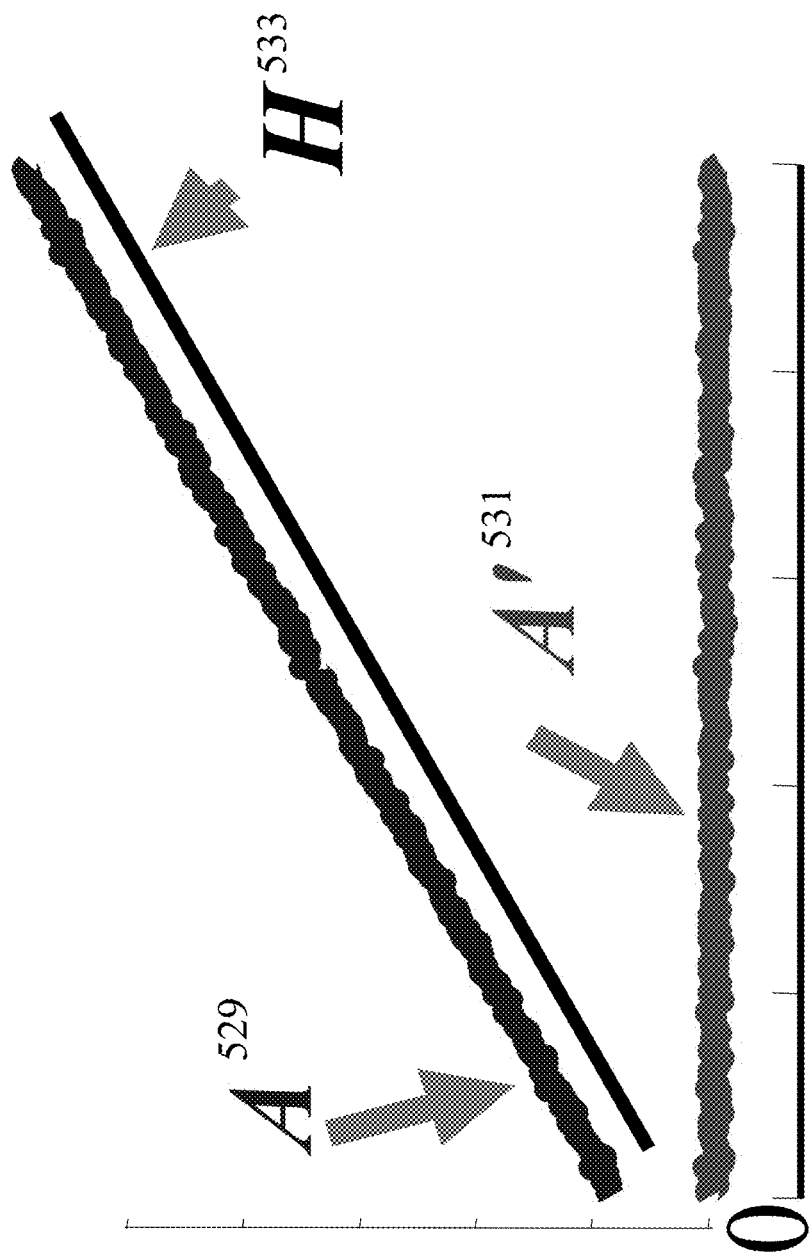
FIG. 5 is a graph illustrating the basic concept of using MDL, using MDL to compare similarity of two subsequences, to evaluate the similarity of subsequences, according to embodiments of the present disclosure.

FIG. 5 is a graph illustrating showing the basic concept of using MDL, using MDL to compare similarity of two subsequences, to evaluate the similarity of subsequences, according to embodiments of the present disclosure. Wherein aspects of the graph are labeled as, "A" 529 is Entropy (A), "A¹" 531 is Entropy (A¹), and "H" 533 is called hypothesis. Further, the MDL is a solution to this problem, such that shows the basic concept of using MDL to evaluate the similarity of subsequences.

Essentially, we can use Description Length (DL) to represent the bit length that is needed to express the subsequence. Entropy is a good measure of DL. We have DL(A)=Entropy(A), DL(H)=Entropy(H), A'=A−H and (A')=Entropy(A'). H is called hypothesis. If we regard a subsequence as hypothesis, then instead of using $DL_{old}$=DL(A)+DL(H) bits to represent the pair of A and H, we can use $DL_{new}$=Entropy(H)+Entropy(A−H). The number of bits saved here is bittosave=$DL_{new}$−$DL_{old}$=DL(A)−DL(A−H). The two subsequences are very similar to each other, so DL(A')=Entropy(A') is very small in this case. As a result, bittosave is a large positive number. So essentially, if subsequences are similar to each other, we should have large positive bittosave. Otherwise bittosave is negative.

Still referring to FIG. 5, is a detailed description of how to make subsequence clusters in time series based on MDL. Here we use a similar approach to find predictive pattern clusters in a Run-to-Failure time series, but it is different from in the following aspects:

(1) We find predictive patterns in the abnormal region of multiple time series instead of only one time series;

(2) We find candidate predictive patterns based on maximal margin algorithm instead of the motif discovery algorithm;

(3) The routine in the main loop is different:

(a) If there are no more unmarked subsequences in the abnormal region, end. Otherwise find a pair or predictive patterns by the maximal margin algorithm;

(b) Then we investigate whether the pair or patterns are a match by evaluating bittosave. If bittosave<0, end. Otherwise we use the CreateCluster process to create a cluster for the predictive pattern found; and (c) Then we iteratively use the AddToCluster process to add subsequences to the predictive pattern cluster until bittosave≤0. Mark out all subsequences added. Then go to (a) again.

(4) The MergeCluster process is not used.

Up to this point, we are able to find all predictive patterns when T is known.

When T is Unknown

FIG. 6 is a graph illustrating when T is unknown, and using an algorithm based on the MDL concept to determine a suitable T, and shows when T is too large, according to embodiments of the present disclosure. Wherein aspects of the graph are labeled as, spurious normal patterns 612, abnormal region T—619 and the point of failure—621.

FIG. 7 is a graph illustrating finding the maximum possible period of a normal pattern, according to embodiments of the present disclosure. Wherein aspects of the graph are labeled as, spurious normal patterns 712, a potential predictive pattern P—749 and the point of failure—721.

FIG. 8 is a graph illustrating resetting T, according to embodiments of the present disclosure. Wherein aspects of the graph are labeled as, a predictive pattern—815, abnormal region T—819 and the point of failure—821.

Referring to FIG. 6, FIG. 7 and FIG. 8, in most real life cases T is actually unknown, which greatly exacerbates the problem. If we guess too small a value of T, we may dismiss the predictive pattern simply because we cannot find it in the abnormal region.

FIG. 6 shows when T is too large, for example, if our guess of T is too large, the search space grows quadratically, and we will very likely find spurious normal patterns 612 simply because those patterns do not have enough time to show up before our guessed system change point. The graph of FIG. 6 illustrates when T is unknown, and using an algorithm based on the MDL concept to determine a suitable T. For example, assume length of the time series is N, and T is much larger than N/2, then we may find a lot of subsequences of length N−T that perfectly distinguishes the normal and abnormal states, as long as the subsequences do not appear right at the beginning of the time series.

FIG. 7 is a graph illustrating finding the maximum possible period of a normal pattern, according to embodiments of the present disclosure. For example, to maximize the opportunity of finding useful predictive patterns and to avoid finding spurious rules, we have designed an algorithm based on the MDL concept to determine a suitable T.

FIG. 8 is a graph illustrating resetting T, according to embodiments of the present disclosure, and shows the basic concept of the algorithm.

Referring to FIG. 6, at first, T is set to be a large number, so the splitting point appears as early as possible in the time series. In that case, there will be a large portion of normal patterns that do not show up in normal region but in the abnormal region. When we try to find predictive patterns of different lengths, we will find that a normal pattern (bold/red) will be picked by the maximal margin algorithm. So how do we know the pattern is normal?

The solution is MDL. With a similar routine as described in section "Finding all possible predictive patterns by MDL", we can find all the "match" of the candidate pattern in the dataset by the AddToCluster operation until bit-tosave<0. As FIG. 7 shows, after that we can evaluate the maximal possible period P of the candidate pattern in the data set. If P≥T, then the splitting point is place too early for the pattern to show up in normal region, so the pattern is actually normal and cannot be regarded as a predictive pattern. We then move the splitting point after the first appearance of the candidate pattern and regenerate the predictive pattern, as FIG. 8 shows.

We iterate the process of and until for predictive patterns of all lengths found by the maximal margin algorithm, (i.e. step 180 above), we have P<T, or the predictive pattern only appears at most once in a time series. T is correctly set after the iteration terminates.

After T is correctly set, we can simply run the algorithm in section to find out all possible predictive patterns (i.e. step 185 above).

Figure 9A:
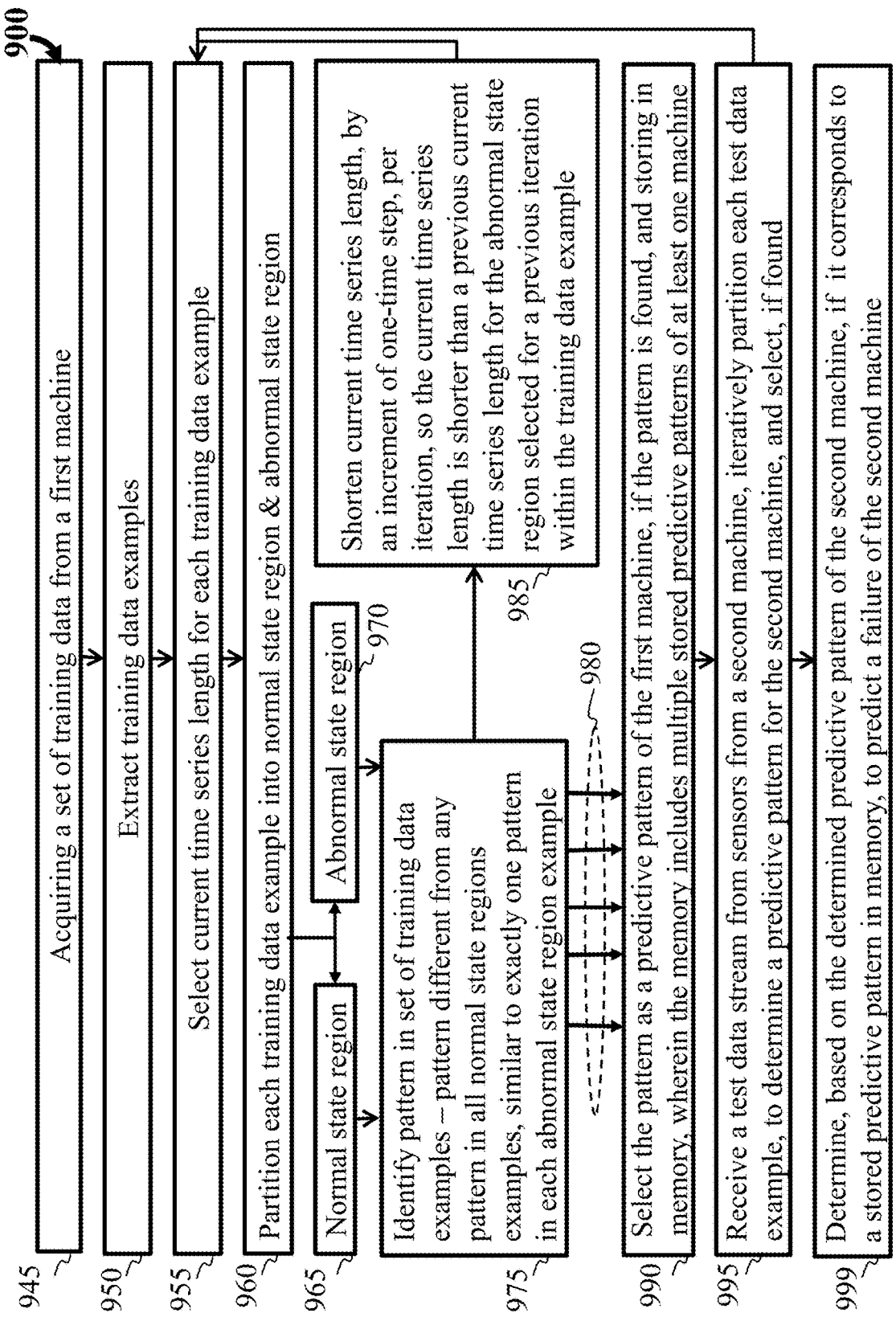
FIG. 9A is a block diagram illustrating the steps of another embodiment incorporating test data from a second machine to identify a predictive pattern, and using the previously stored predictive patterns, compared to the identified predictive pattern of the second machine, to predict a failure of the second machine, according to an embodiment of the present disclosure.

FIG. 9A is a block diagram illustrating the steps of another embodiment incorporating test data from a second machine to identify a predictive pattern, and using the previously stored predictive patterns, compared to the identified predictive pattern of the second machine, to predict a failure of the second machine, according to an embodiment of the present disclosure. Further, the second machine can be similar to the machine, and each sensor of the second machine measures a same parameter as a respective sensor of the sensors of the machine. Further still, the test data example of the second machine can have a same period of time as each training data example in the set of training data examples of the machine, or the test data example of the second machine can have a same sampling rate as a regular sampling rate for each training data example in the set of training data example of the machine.

Figure 9B:
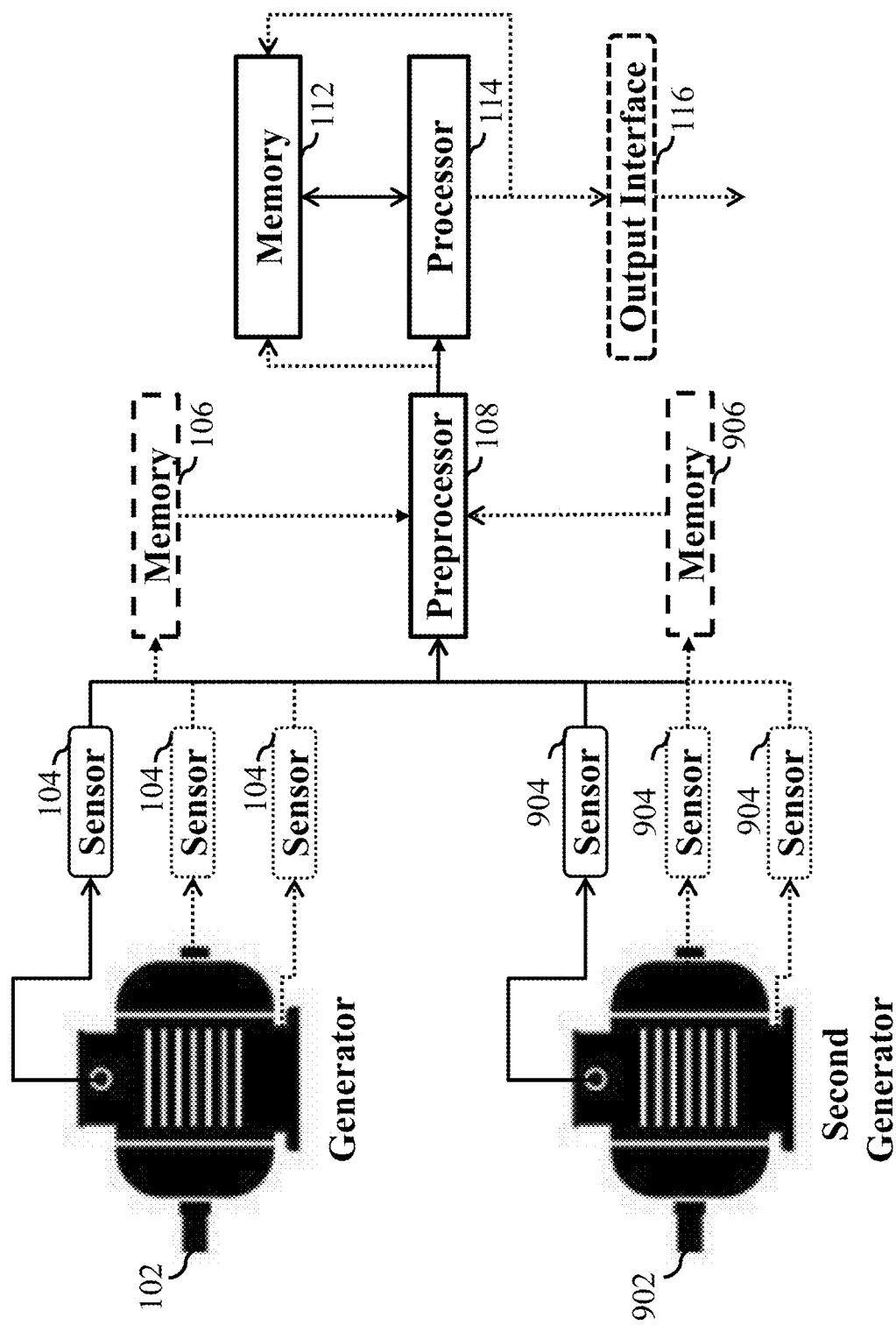
FIG. 9B is a block diagram illustrating components of the system of FIG. 9A, according to an embodiment of the present disclosure.

FIG. 9B is a block diagram illustrating components of the system of FIG. 9A, according to an embodiment of the present disclosure. The second machine 902 or generator can include sensors 904 optionally connected to a memory 906 or directly connected to the preprocessor 108, which may be connected to memory 112. The preprocessor sends the data to processor 114 to be processed and the processed data can either be stored in memory 112 or outputted via the output interface 116.

Referring to FIG. 9A and FIG. 9B, at step 995, the method 900 includes receiving, by the preprocessor 108, a test data stream from a sensor 904 of second machine 902. Further, a user interface in communication with the computer and the computer readable memory, acquires and stores the set of test data examples in the computer readable memory upon receiving an input from a surface of the user interface by a user.

Step 995 includes determining a predictive pattern for the second machine, and selecting it, if found, according to processing the test data stream or set of test data examples via steps 945 to 990.

Step 999, determines based on the determined predictive pattern of the second machine 902, if the determined predictive pattern of the second machine corresponds to a stored predictive pattern in memory 112, to predict a failure of the second machine 902.

Specifically, whether one or more test data examples extracted from the test data stream predict a failure of the second machine 902. The one or more test data examples are extracted from one or more portions of the test data stream. For example, the processor 114 may determine whether one or more test data examples extracted from the test data stream predict a failure of the machine 902. The test data in the one or more portions of the test data stream were sampled at the same sampling rate as the stored training data in the training data examples used to generate the determined predictive pattern(s). Further, the method 900 can include predicting a failure of the second machine 902, if a ratio of a number of test data examples of the one or more test data examples that predict the failure of the second machine 902 to a total number of the one or more test data examples processed based on the determined predictive patterns (from the test data examples via steps 945 to 990), exceeds a threshold. For example, the threshold may be a value determined based on empirical analysis.

In some example embodiments, the method 900 can exclude a portion of the training data stream that may include invalid data in extracting the training data examples from the one or more portions of the training data stream. The method 900 may also include extracting the training data examples such that two consecutive/adjacent data examples have overlapping data portions and non-overlapping data portions, wherein the overlapping data portions are less than a threshold percentage of the length of the training data segments, which could be predetermined such as 10%, 40% or 80%.

FIG. 10A is a block diagram illustrating the steps of another embodiment incorporating test data streams from sensors being of different types from a third machine, using the previously stored predictive patterns, compared to the identified two predictive patterns of the third machine, to predict a failure of the third machine, according to an embodiment of the present disclosure.

FIG. 10B is a block diagram illustrating components of the system of FIG. 10A, according to an embodiment of the present disclosure. The third machine 1002 or generator can include sensors 1004 optionally connected to a memory 1006 or directly connected to the preprocessor 108, which may be connected to memory 112. The preprocessor 108 sends the data to processor 114 to be processed and the processed data can either be stored in memory 112 or outputted via the output interface 116.

Referring to FIG. 10A and FIG. 10B, at step 1005 of FIG. 10A, the method 1000 includes receiving, by the preprocessor 108, two test data streams from two sensors 1004 of third machine 1002, wherein the sensors 1004 are of different type.

Step 1010 of FIG. 10A includes extracting a set of test data examples from each test data stream of the two test data streams of the third machine 1002.

Step 1010 includes identifying, based on the stored set of training data examples including the normal state region and abnormal state region for each training data example, each test data example of the two sets of test data examples of the third machine, that correspond to a stored normal state region of at least one stored training data example or at least one stored abnormal state region of at least one stored training data example, to identify a predictive pattern for each test data stream of the third machine.

Step 1010 includes predicting a failure of the third machine by taking either one the two predictive patterns from the two test data streams of the two sensors, when compared to the stored predictive patterns in memory.

Figure 11A:
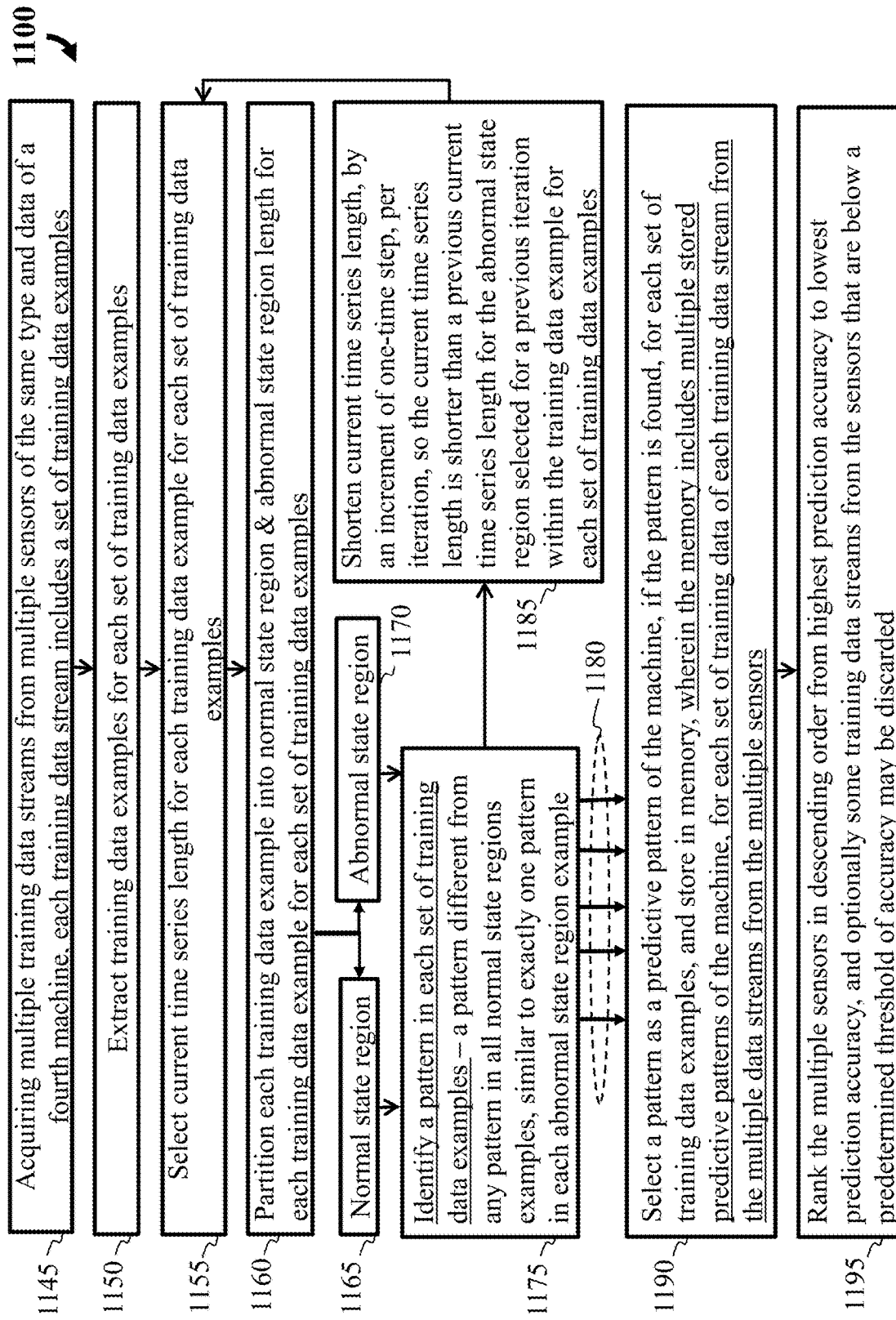
FIG. 11A is a block diagram illustrating the steps of another embodiment incorporating test data streams from sensors being of the same type from a fourth machine, using the previously stored predictive patterns, compared to the identified predictive patterns of the fourth machine that are above a predetermined threshold, to predict a failure of the fourth machine, according to an embodiment of the present disclosure.

Referring to FIG. 11A and FIG. 11B, at step 1105 of FIG. 11A, the method 1100 includes step 1145, acquiring multiple test data streams from multiple sensors of the same type and data of a fourth machine, wherein each test data stream includes a set of test data examples. The next step 1150 includes extracting test data examples for each set of test data examples from the multiple test data streams from multiple sensors of the fourth machine.

FIG. 11B is a block diagram illustrating components of the system of FIG. 11A, according to an embodiment of the present disclosure. The fourth machine 1102 or generator can include sensors 1104 optionally connected to a memory 1106 or directly connected to the preprocessor 108, which may be connected to memory 112. The preprocessor 108 sends the data to processor 114 to be processed and the processed data can either be stored in memory 112 or outputted via the output interface 116.

Step 1155 of FIG. 11A includes selecting a current time series length for an abnormal state region within each test data example of the multiple test data examples, at an estimated moment of failure and ending at failure.

Step 1160 of FIG. 11A includes partitioning each test data example into a normal state region and an abnormal state region. Optionally, the periods of time for the sets of test data examples can be one of: the same period of time or some test data examples in the set of test data examples have periods of time that are different from other test data example periods of time in the set of test data examples. Further, optionally each test data example in the set of test data examples can be sampled at a regular sampling rate or an approximate same period of time, for the set of test data examples.

Step 1165 FIG. 11A includes data specific to the normal state region, such that the normal state region includes normal operation of the fourth machine without any signs of failure of the fourth machine.

Step 1170 of FIG. 11A includes data specific to the abnormal state region, such that the abnormal state region corresponds to the fourth machine failing to operate normally ending with the failure of the fourth machine.

Step 1175 of FIG. 11A includes identifying a pattern in the sets of test data examples, such that the pattern is different from any other patterns present in all normal state regions of the sets of test data examples, and is similar to exactly one pattern in each abnormal state region of the sets of test data examples.

Step 1180 includes the iterative process including the iteratively partitions of each training data example, and step 185 includes shortening the current time series length, by an increment of one-time step, per iteration, so the current time series length is shorter than a previous current time series length for the abnormal state region selected for a previous iteration within the training data example.

Step 1185 of FIG. 11A includes shortening the current time series length, by an increment of one-time step, per iteration, so the current time series length is shorter than a previous current time series length for the abnormal state region selected for a previous iteration within the test data examples.

Step 1190 of system FIG. 11A includes selecting the pattern as the predictive pattern, if the pattern is found. Specifically, selecting a pattern as a predictive pattern of the fourth machine, if the pattern is found, for each set of training data examples, and store in memory, wherein the memory includes multiple stored predictive patterns of the fourth machine, for each set of test data of each test data stream from the multiple data streams from the multiple sensors.

Step 1195 of system FIG. 11A includes ranking the multiple sensors in descending order from highest prediction accuracy to lowest prediction accuracy, and optionally some test data streams from the sensors that are below a predetermined threshold of accuracy may be discarded.

It is contemplated the ranking of the sensor may be by several methods. For example, in order to identify the most relevant sensors for failure prediction from among the sensors 904, a single sensor classification accuracy value may be computed for a number of features of each test data stream from the respective sensors 904. In some example embodiments, the computed features can be a mean value, a missing data points, a mean slope, a ratio of measurements, and an exponential decay. Mean value refers to the mean of each test data value, excluding any missing data points. For example, the mean value can be used as a feature because failures may be correlated with a decrease or increase in a particular parameter (e.g., vibration, or some other measurement) from the parameter's normal value.

FIG. 11C is a block diagram illustrating the steps of another embodiment incorporating test data streams from sensors being of the same type from a fifth machine, using the previously stored predictive patterns, compared to the identified predictive patterns of the fifth machine that are above a predetermined threshold, to predict a failure of the fifth machine, according to an embodiment of the present disclosure.

Step 1105 of FIG. 11C, includes receiving test data streams from sensors from a fifth machine. Step 1110 includes extracting sets of test data examples from the test data streams of the fifth machine. Step 1115 includes identifying based on the stored set of training data examples above the predetermined threshold of accuracy, that include the normal state region and abnormal state region for each training data example, by evaluating each test data example of the sets of test data examples of the fifth machine, corresponding to a stored normal state region of at least one stored training data example or at least one stored abnormal state region of at least one stored training data example, to identify a predictive pattern for each test data stream, predict a failure of the fifth machine.

Figure 12:
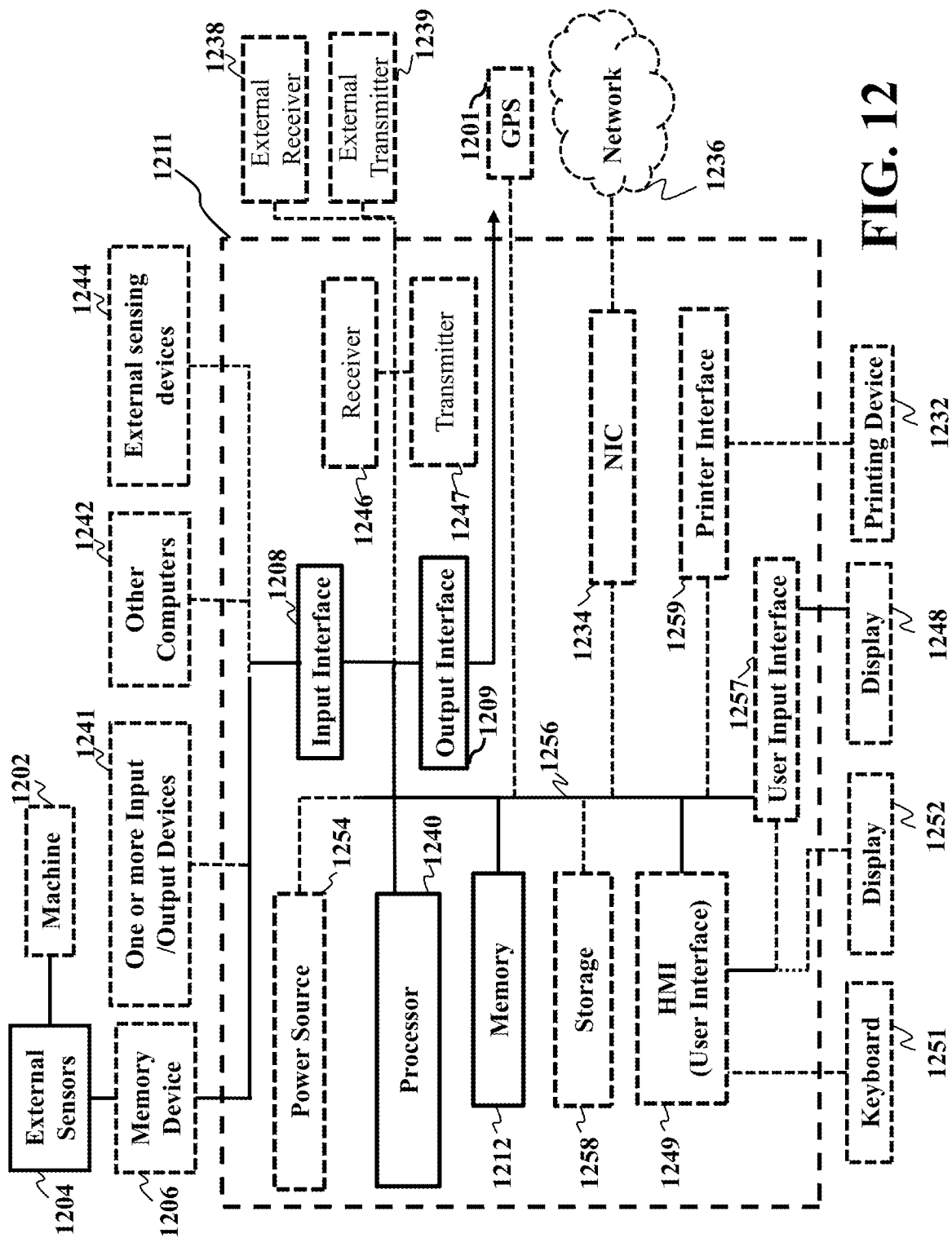
FIG. 12 is a block diagram of illustrating the method of FIG. 1A, that can be implemented using an alternate computer or processor, according to embodiments of the present disclosure.

FIG. 12 is a block diagram of illustrating the method of FIG. 1A, that can be implemented using an alternate computer or processor, according to embodiments of the present disclosure. The computer 1211 includes a processor 1240, computer readable memory 1212, storage 1258 and user interface 1249 with display 1252 and keyboard 1251, which are connected through bus 1256. For example, the user interface 1264 in communication with the processor 1240 and the computer readable memory 1212, acquires and stores the set of training data examples in the computer readable memory 1212 upon receiving an input from a surface, keyboard surface 1264, of the user interface 1264 by a user.

The computer 1211 can include a power source 1254, depending upon the application the power source 1254 may be optionally located outside of the computer 1211. Linked through bus 1256 can be a user input interface 1257 adapted to connect to a display device 1248, wherein the display device 1248 can include a computer monitor, camera, television, projector, or mobile device, among others. A printer interface 1259 can also be connected through bus 1256 and adapted to connect to a printing device 1232, wherein the printing device 1232 can include a liquid inkjet printer, solid ink printer, large-scale commercial printer, thermal printer, UV printer, or dye-sublimation printer, among others. A network interface controller (NIC) 1234 is adapted to connect through the bus 1256 to a network 1236, wherein time series data or other data, among other things, can be rendered on a third party display device, third party imaging device, and/or third party printing device outside of the computer 1211.

Still referring to FIG. 12, the time series data or other data, among other things, can be transmitted over a communication channel of the network 1236, and/or stored within the storage system 1258 for storage and/or further processing. Further, the time series data or other data may be received wirelessly or hard wired from a receiver 1246 (or external receiver 1238) or transmitted via a transmitter 1247 (or external transmitter 1239) wirelessly or hard wired, the receiver 1246 and transmitter 1247 are both connected through the bus 1256. The computer 1211 may be connected via an input interface 1208 to external sensing devices 1244 and external input/output devices 1241. For example, the external sensing devices 1244 may include sensors gathering data before-during-after of the collected time-series data of the machine. For instance, environmental conditions approximate the machine or not approximate the machine, i.e. temperature at or near machine, temperature in building of location of machine, temperature of outdoors exterior to the building of the machine, video of machine itself, video of areas approximate machine, video of areas not approximate the machine, other data related to aspects of the machine. The computer 1211 may be connected to other external computers 1242. An output interface 1209 may be used to output the processed data from the processor 1240.

Figure 13:
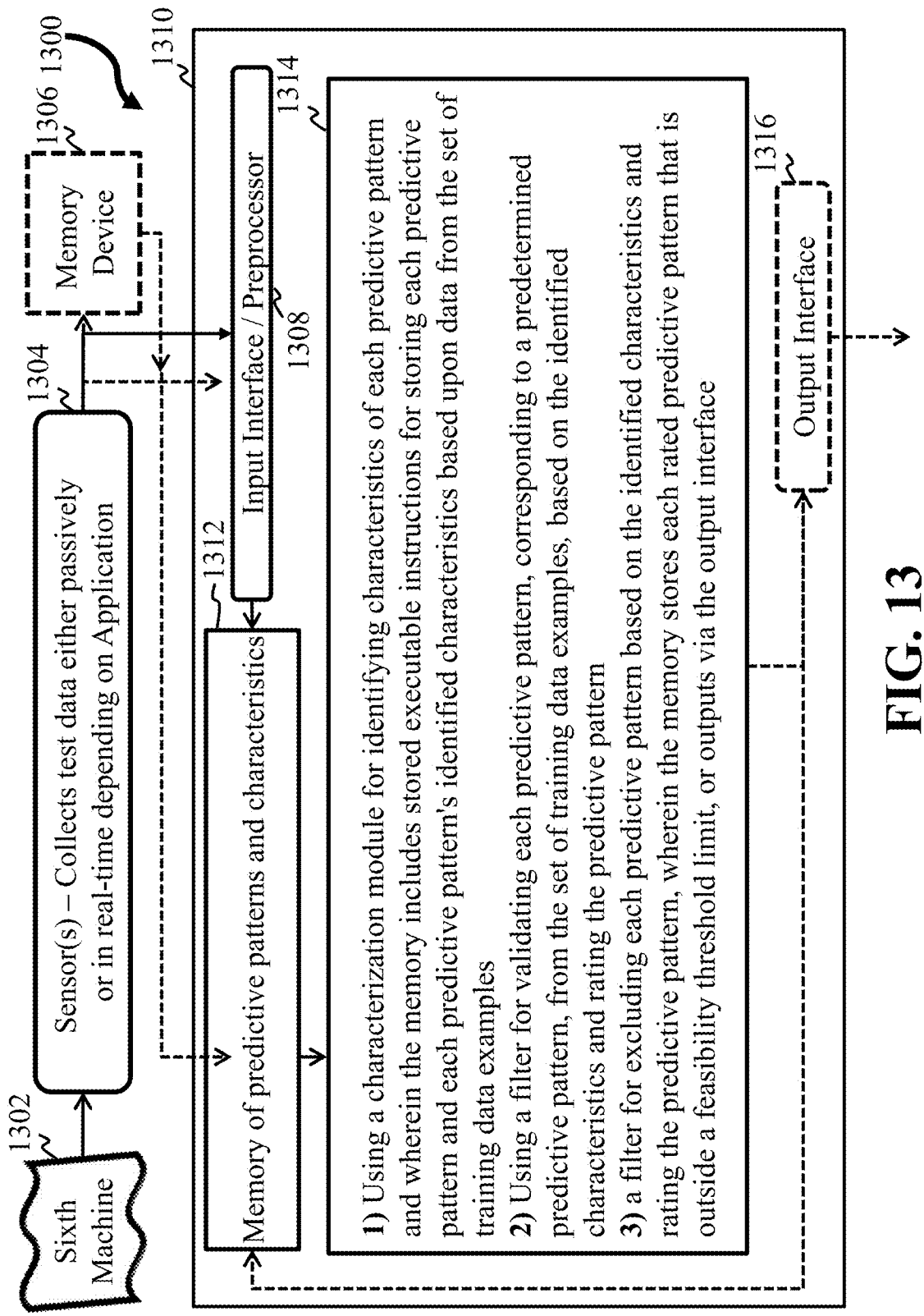
FIG. 13 is a block diagram illustrating another method for determining a pattern in time series data representing an operation of a machine, according to embodiments of the present disclosure.

FIG. 13 is a block diagram illustrating another method 1300 for determining a pattern in time series data representing an operation of a six machine 1302, according to embodiments of the present disclosure. The method 1300 including a sensor 1304 in communication with the sixth machine 1302. A computer readable memory 1312 to store and provide a set of test data examples generated by the sensor 1304 in communication with the sixth machine 1302. Wherein each test data example represents an operation of the sixth machine 1302 for a period of time ending with a failure of the sixth machine 1302. An input interface/preprocessor 1308 may be utilized along with memory 1306. The rated predictive pattern(s) maybe stored in memory 1312 or outputted via the output interface 1316.

The method includes a characterization module for identifying characteristics of each predictive pattern and wherein the computer readable memory includes stored executable instructions for storing each predictive pattern and each predictive pattern's identified characteristics based upon data from the set of training data examples. Further, the method includes a filter for validating each predictive pattern, corresponding to a predetermined predictive pattern, from the set of training data examples, based on the identified characteristics and rating the predictive pattern. Further still, a filter for excluding each predictive pattern based on the identified characteristics and rating the predictive pattern, wherein the computer readable memory stores each rated predictive pattern that is outside a feasibility threshold limit.

Still referring to FIG. 13, the method further includes receiving a test data example from sensors in communication from a sixth machine and storing in the computer readable memory. Determining, by the computer, based on at least one stored predictive pattern in the computer readable memory, whether one or more test data segment extracted from the test data example identify a pattern of the second machine that corresponds to the at least one stored predictive pattern in the computer readable memory. Selecting the pattern as a second predictive pattern, if the pattern is found. Finally, storing the second predictive pattern in the computer readable memory or outputting the second predictive pattern via an output interface in communication with the computer, wherein the second predictive pattern assists in management of the second machine.

The characterization module can determine different characteristics for every predictive pattern found. The characterization module reads the predictive patterns, and their associated characteristics, computes pattern and characteristics of the pattern and write results back to the processor. An example of a pattern characteristic is a symmetry number. Symmetry is a measure of the similarity of the two halves of a pattern. For example, with a head and shoulder pattern, the symmetry number can identify how balanced the head is and how similar the left and right shoulders are to each other.

Patterns and pattern characteristic information can be passed to filter that screens output based on defined criteria. These can be supplied by pre-stored data in memory. Filters restrict the patterns passed out of the system to ensure that patterns delivered meet certain minimum thresholds. For example, a filter may specify that only patterns of a high symmetry number are to be passed.

Still referring to FIG. 13, the method further includes identifying characteristics of each predictive pattern using a characterization module, wherein the computer readable memory includes stored executable instructions for storing each predictive pattern's identified characteristics based upon data from the set of training data examples. Validating each predictive pattern using a filter, wherein each predictive pattern corresponds to a predetermined predictive pattern, from the set of training data examples, based on the identified characteristics of the predictive pattern and rating the predictive pattern. Excluding each predictive pattern using a filter based on the identified characteristics and rating the predictive pattern, wherein the computer readable memory stores each rated predictive pattern that is outside a feasibility threshold limit.

Still referring to FIG. 13, the method further includes receiving a test data example from sensors in communication from a second machine and storing in the computer readable memory. Determining, by the computer, based on at least one stored predictive pattern in the computer readable memory, whether one or more test data segment extracted from the test data example identify a pattern of the second machine that corresponds to the at least one stored predictive pattern in the computer readable memory. Selecting the pattern as a second predictive pattern, if the pattern is found. Finally, storing the second predictive pattern in the computer readable memory or outputting the predictive pattern via an output interface in communication with the computer, wherein the second predictive pattern assists in management of the second machine.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A system for managing an impending failure of a machine by determining a pattern in time series data representing an operation of the machine, comprising:
   a computer readable memory includes stored data, the stored data includes predictive patterns determined from a set of training data examples generated by a sensor in communication with a training machine, each training data example represents an operation of the training machine for a period of time ending with a failure of the training machine, such that the set of training data examples are unprocessed data such that regions of normal operation and abnormal operation in them are unknown, wherein the stored predictive patterns are previously determined, by a training processor, the training processor is configured to:
   sequentially, select a length of a period of time for a current time series for the abnormal state region within each training data example, by considering in sequence every possible splitting point in the time series in turn;
   partition for the currently selected splitting point, each training data example in the set of training data examples into the normal state region and the abnormal state region having the length of the period of time for the current time series, to identify a pattern in the set of training data examples, such that the pattern is different from any other patterns present in all normal state regions of the set of training data examples, and is similar to exactly one pattern in each abnormal state region of the set of training data examples;
   select the pattern as the predictive pattern indicative of a predictive estimate of an impending failure of the training machine, and if the pattern is found, store the predictive pattern in the computer readable memory;
   increment the estimated time moment of start of the abnormal operation by one, and proceed with a next iteration of sequential partitioning the current time series, until the estimated time moment of the start of the abnormal operation reaches the end of the current time series;
   an input interface to receive sensor data, the sensor data includes test data examples obtained from a sensor in communication with the machine;
   a processor in communication with the computer readable memory and the input interface, is configured to:
   determine, based on at least one stored predictive pattern in the computer readable memory, whether one or more test data example extracted from the test data examples matches a pattern of the machine that corresponds to the at least one stored predictive pattern, and use the match as an indication of an impending failure of the machine, if the pattern is found; and
   manage the machine, according to the predictive estimate of the impending failure of the machine.

2. The system of claim 1, wherein the abnormal state region corresponds to the training machine failing to operate normally ending with the failure of the training machine, and the length of the period of time for the current time series of the abnormal state region is an amount of discrete-time data within the abnormal state region of each training data example in the set of training data examples.

3. The system of claim 1, where the predictive pattern determined from the set of training data examples is different from a pattern in the normal region, if a Euclidean distance between the two patterns exceeds a pre-specified threshold.

4. The system of claim 1, where the predictive pattern determined from the set of training data examples is considered similar to a pattern in the normal region if a Euclidean distance between the two patterns is lower than a pre-specified threshold.

5. The system of claim 1, wherein the searching for the predictive pattern determined from the set of training data examples is performed by a fast shapelet discovery algorithm.

6. The system of claim 1, wherein the training processor partitions each training data example in the set of training data examples into the normal state region based on data identifying a portion of the training data example that is generated by the sensor of training machine while the training machine was operating normally, and partitions each training data example in the set of training data examples into the abnormal state region based on data identifying a portion of the training data example that is generated by the sensor of training machine while the training machine was failing to operate normally and ending with the failure of the training machine.

7. The system of claim 1, wherein lengths of the periods of time for the set of training data examples are one of: a same length of periods of time or some training data examples in the set of training data examples have lengths of periods of time that are different from other training data example lengths of periods of time in the set of training data examples.

8. The system of claim 1, wherein the machine is similar to the training machine, and the sensor of the machine measures a same parameter as a respective sensor of the sensor of the training machine.

9. The system of claim 8, wherein each parameter relates to the operation of the training machine including one or a combination of: fluid force data, fluid energy data, vibration data, temperature data, voltage data or current data.

10. The system of claim 1, wherein the machine is stopped from operation or replaced, as soon as the at least one stored predictive pattern is matched to the one or more test data example.

11. The system of claim 1, wherein the training data is used to estimate an expected time interval between the time of occurrence of a predictive pattern and the time of failure of the machine, averaged over multiple training time series, and the machine is stopped or replaced before this average expected time interval after the appearance of the predictive pattern has elapsed.

12. The system of claim 1, wherein the training data is used to estimate a minimal time interval between the time of occurrence of a predictive pattern and the time of failure of the machine, over multiple training time series, and the machine is stopped or replaced before this minimal time interval after the appearance of the predictive pattern has elapsed.

13. A method for managing an impending failure of a machine by determining a pattern in time series data representing an operation of the machine, comprising:
   accessing stored data, the stored data includes stored predictive patterns determined from a set of training data examples generated by a sensor in communication with a training machine stored in a computer readable memory, each training data example represents an operation of the training machine for a period of time ending with a failure of the training machine, such that the set of training data examples are unprocessed data such that regions of normal operation and abnormal operation in them are unknown, wherein the stored predictive patterns are previously determined, by a training processor, that is configured to:
      sequentially, selecting a length of a period of time for a current time series for the abnormal state region within each training data example, by considering in sequence every possible splitting point in the time series in turn;
      partitioning for the currently selected splitting point, each training data example in the set of training data examples into the normal state region and the abnormal state region having the length of the period of time for the current time series, to identify a pattern in the set of training data examples, such that the pattern is different from any other patterns present in all normal state regions of the set of training data examples, and is similar to exactly one pattern in each abnormal state region of the set of training data examples; and
      selecting the pattern as the predictive pattern indicative of a predictive estimate of an impending failure of the training machine, and if the pattern is found, store in the computer readable memory;
      incrementing the estimated time moment of start of the abnormal operation by one, and proceed with a next iteration of sequential partitioning the current time series, until the estimated time moment of the start of the abnormal operation reaches the end of the current time series;
   receiving, via an input interface, test data examples from a sensor in communication with the machine;
   using a computer in communication with the computer readable memory and the input interface, the computer is configured to:
      determine, based on at least one stored predictive pattern in the computer readable memory, whether one or more test data example extracted from the test data examples matches a pattern of the machine that corresponds to the at least one stored predictive pattern, and use the match as an indication of an impending failure of the machine, if the pattern is found; and
      manage the machine, according to the predictive estimate of the impending failure of the machine.

14. The method of claim 13, wherein each training data example in the set of training data examples were sampled at a sampling rate or an approximate same length of period of time, for the set of training data examples.

15. The method of claim 13, wherein a user interface in communication with the computer and the computer readable memory, acquires and stores the set of training data examples in the computer readable memory upon receiving an input from a surface of the user interface by a user.

16. The method of claim 13, further comprising:
   a characterization module for determining a suitability of each candidate predictive pattern using a maximal margin algorithm, that is determined from the set of training data examples and wherein the computer readable memory includes stored executable instructions for storing each predictive pattern and each predictive pattern's identified characteristics based upon data from the set of training data examples;
   a filter for validating each predictive pattern, corresponding to a predetermined predictive pattern, from the set of training data examples, based on the identified characteristics and rating the predictive pattern; and
   a filter for excluding each predictive pattern based on the identified characteristics and rating the predictive pattern, wherein the computer readable memory stores each rated predictive pattern that is outside a feasibility threshold limit.

17. The method of claim 13, further comprising:
   a characterization module for determining a suitability of each candidate predictive pattern using a maximal margin algorithm, wherein the computer readable memory includes stored executable instructions for storing each predictive pattern's identified characteristics based upon data from the set of training data examples;
   validating each predictive pattern using a filter, wherein each predictive pattern corresponds to a predetermined predictive pattern, from the set of training data examples, based on the identified characteristics of the predictive pattern and rating the predictive pattern; and
   excluding each predictive pattern using a filter based on the identified characteristics and rating the predictive pattern, wherein the computer readable memory stores each rated predictive pattern that is outside a feasibility threshold limit.

18. A non-transitory computer readable storage medium embodied thereon a program executable by a computer for performing a method for managing an impending failure of a machine by determining a pattern in time series data representing an operation of the machine, the method comprising:
   accessing stored data, the stored data includes stored predictive patterns determined from a set of training data examples generated by a sensor in communication with a training machine stored in the non-transitory computer readable storage medium, each training data example represents an operation of the training machine for a period of time ending with a failure of the training machine, such that the set of training data examples are unprocessed data such that regions of normal operation and abnormal operation in them are unknown, wherein the previously stored predictive patterns are determined, by a training processor configured to:

sequentially, selecting a length of a period of time for a current time series for the abnormal state region within each training data example by considering in sequence every possible splitting point in the time series in turn;

partitioning for the currently selected splitting point, each training data example in the set of training data examples into the normal state region and the abnormal state region having the length of the period of time for the current time series, to identify a pattern in the set of training data examples, such that the pattern is different from any other patterns present in all normal state regions of the set of training data examples, and is similar to exactly one pattern in each abnormal state region of the set of training data examples;

selecting the pattern as the predictive pattern indicative of a predictive estimate of an impending failure of the training machine, and if the pattern is found, store in the computer readable memory;

increment the estimated time moment of start of the abnormal operation by one, and proceed with a next iteration of sequential partitioning the current time series, until the estimated time moment of the start of the abnormal operation reaches the end of the current time series;

receiving, via an input interface, test data examples from a sensor in communication with the machine;

using a computer in communication with the computer readable memory and the input interface, the computer is configured to:

determine, based on at least one stored predictive pattern in the computer readable memory, whether one or more test data example extracted from the test data examples matches a pattern of the machine that corresponds to the at least one stored predictive pattern, and use the match as an indication of an impending failure of the machine, if the pattern is found; and manage the machine, according to the predictive estimate of the impending failure of the machine.

19. A system for managing an impending failure of a machine by determining a pattern in time series data representing an operation of the machine, comprising:

a memory includes stored data, the stored data includes stored predictive patterns determined from a set of training data examples generated by a plurality of sensors in communication with a training machine, each training data example represents an operation of the training machine for a period of time ending with a failure of the training machine, such that the set of training data examples are unprocessed data such that regions of normal operation and abnormal operation in them are unknown, wherein the stored predictive patterns are previously determined, by a training processor configured to:

sequentially, select a length of a period of time for a current time series for the abnormal state region within each training data example by considering in sequence every possible splitting point in the time series in turn;

partition for the currently selected splitting point, each training data example in the set of training data examples into the normal state region and the abnormal state region having the length of the period of time for the current time series, to identify a pattern in the set of training data examples, such that the pattern is different from any other patterns present in all normal state regions of the set of training data examples, and is similar to exactly one pattern in each abnormal state region of the set of training data examples;

select the pattern as the predictive pattern indicative of a predictive estimate of an impending failure of the training machine, and if the pattern is found, store the predictive pattern in the memory;

a user interface in communication with a computer and the memory, acquires and stores sensor data, wherein the computer is configured to:

determine, based on at least one stored predictive pattern in the memory, whether one or more test data example extracted from the test data examples matches a pattern of the machine that corresponds to the at least one stored predictive pattern, and use the match as an indication of an impending failure of the machine, if the pattern is found; and manage the machine, according to the predictive estimate of the impending failure of the machine.

20. A method for managing an impending failure of a machine by determining a pattern in time series data representing an operation of the machine, comprising:

using a memory having stored data, the stored data includes stored predictive patterns determined from a set of training data examples generated by a plurality of sensors in communication with a training machine, each training data example represents an operation of the training machine for a period of time ending with a failure of the training machine, such that the set of training data examples are unprocessed data such that regions of normal operation and abnormal operation in them are unknown, wherein the stored predictive patterns are previously determined, by a training processor that is configured to:

sequentially, selecting a length of a period of time for a current time series for the abnormal state region within each training data example by considering in sequence every possible splitting point in the time series in turn;

partitioning for the currently selected splitting point, each training data example in the set of training data examples into the normal state region and the abnormal state region having the length of the period of time for the current time series, to identify a pattern in the set of training data examples, such that the pattern is different from any other patterns present in all normal state regions of the set of training data examples, and is similar to exactly one pattern in each abnormal state region of the set of training data examples;

selecting the pattern as the predictive pattern indicative of a predictive estimate of an impending failure of the training machine, and if the pattern is found, store in the memory;

increment the estimated time moment of start of the abnormal operation by one, and proceed with a next iteration of sequential partitioning the current time series, until the estimated time moment of the start of the abnormal operation reaches the end of the current time series;

receiving, via an input interface, test data examples generated by a sensor in communication with the machine;

using a computer in communication with the memory and the input interface, the computer is configured to:

determining, based on at least one stored predictive pattern in the memory, whether one or more test data example extracted from the test data examples matches a pattern of the machine that corresponds to the at least one stored predictive pattern, and use the match as an indication of an impending failure of the machine, if the pattern is found; and managing the machine, according to the predictive estimate of the impending failure of the machine.

* * * * *